United States Patent
Nishizawa et al.

(10) Patent No.: US 9,382,883 B2
(45) Date of Patent: Jul. 5, 2016

(54) INTAKE NOISE REDUCTION DEVICE AND STRADDLE-TYPE VEHICLE INCLUDING THE SAME

(71) Applicant: YAMAHA HATSUDOKI KABUSHIKI KAISHA, Iwata-shi, Shizuoka-ken (JP)

(72) Inventors: Kazuya Nishizawa, Shizuoka (JP); Hisahide Ueno, Shizuoka (JP); Takuji Terada, Shizuoka (JP)

(73) Assignee: YAMAHA HATSUDOKI KABUSHIKI KAISHA, Shizuoka-Ken (JP)

( * ) Notice: Subject to any disclaimer, the term of this patent is extended or adjusted under 35 U.S.C. 154(b) by 0 days.

(21) Appl. No.: 14/728,351

(22) Filed: Jun. 2, 2015

(65) Prior Publication Data

US 2015/0345440 A1 Dec. 3, 2015

(30) Foreign Application Priority Data

Jun. 3, 2014 (JP) ................. 2014-114615

(51) Int. Cl.
| | |
|---|---|
| *F02M 35/14* | (2006.01) |
| *F02M 35/12* | (2006.01) |
| *F02M 35/02* | (2006.01) |
| *F02M 35/10* | (2006.01) |
| *B62M 7/04* | (2006.01) |
| *B62K 19/40* | (2006.01) |
| *F02M 35/16* | (2006.01) |
| *F02M 35/024* | (2006.01) |

(52) U.S. Cl.
CPC ............ *F02M 35/1255* (2013.01); *B62K 19/40* (2013.01); *B62M 7/04* (2013.01); *F02M 35/0201* (2013.01); *F02M 35/02425* (2013.01); *F02M 35/10118* (2013.01); *F02M 35/14* (2013.01); *F02M 35/162* (2013.01)

(58) Field of Classification Search
CPC .......... F02M 35/1255; F02M 35/1261; F02M 35/12; F02M 35/14; F02M 35/162
USPC ......................................................... 180/219
See application file for complete search history.

(56) References Cited

U.S. PATENT DOCUMENTS

| | | | | |
|---|---|---|---|---|
| 4,757,874 | A * | 7/1988 | Yanagishita | ....... F02M 35/1255 181/227 |
| 7,357,205 | B2 * | 4/2008 | Nishizawa | ........... F02M 35/022 123/41.56 |
| 7,412,960 | B2 * | 8/2008 | Nishizawa | ........... F02M 35/022 123/184.57 |
| 8,833,326 | B2 * | 9/2014 | Koyama | ............... F02M 35/162 123/184.57 |

FOREIGN PATENT DOCUMENTS

| | | |
|---|---|---|
| JP | S63-177656 U | 11/1988 |
| JP | H04-306183 A | 10/1992 |
| JP | H05-18330 A | 1/1993 |
| JP | 2010-042707 A | 2/2010 |

* cited by examiner

*Primary Examiner* — Joseph Rocca
*Assistant Examiner* — Michael Stabley
(74) *Attorney, Agent, or Firm* — Rabin & Berdo, P.C.

(57) ABSTRACT

An intake noise reduction device includes an air cleaner, an intake funnel and a resonator, and is connected to an engine via a throttle body. The resonator is provided inside of the air cleaner. The resonator includes a chamber portion and a pipe portion. The pipe portion is formed to extend downward from the chamber portion, and has an opening end at a lower end. The intake funnel is provided at a lower end of the air cleaner. An opening end of the resonator is inserted into the intake funnel. A cross sectional area of an intake passage between the intake funnel and the pipe portion is set to not less than an opening area of an intake passage of the throttle body opened to a maximum throttle opening.

8 Claims, 24 Drawing Sheets

↑ K1

F I G. 16
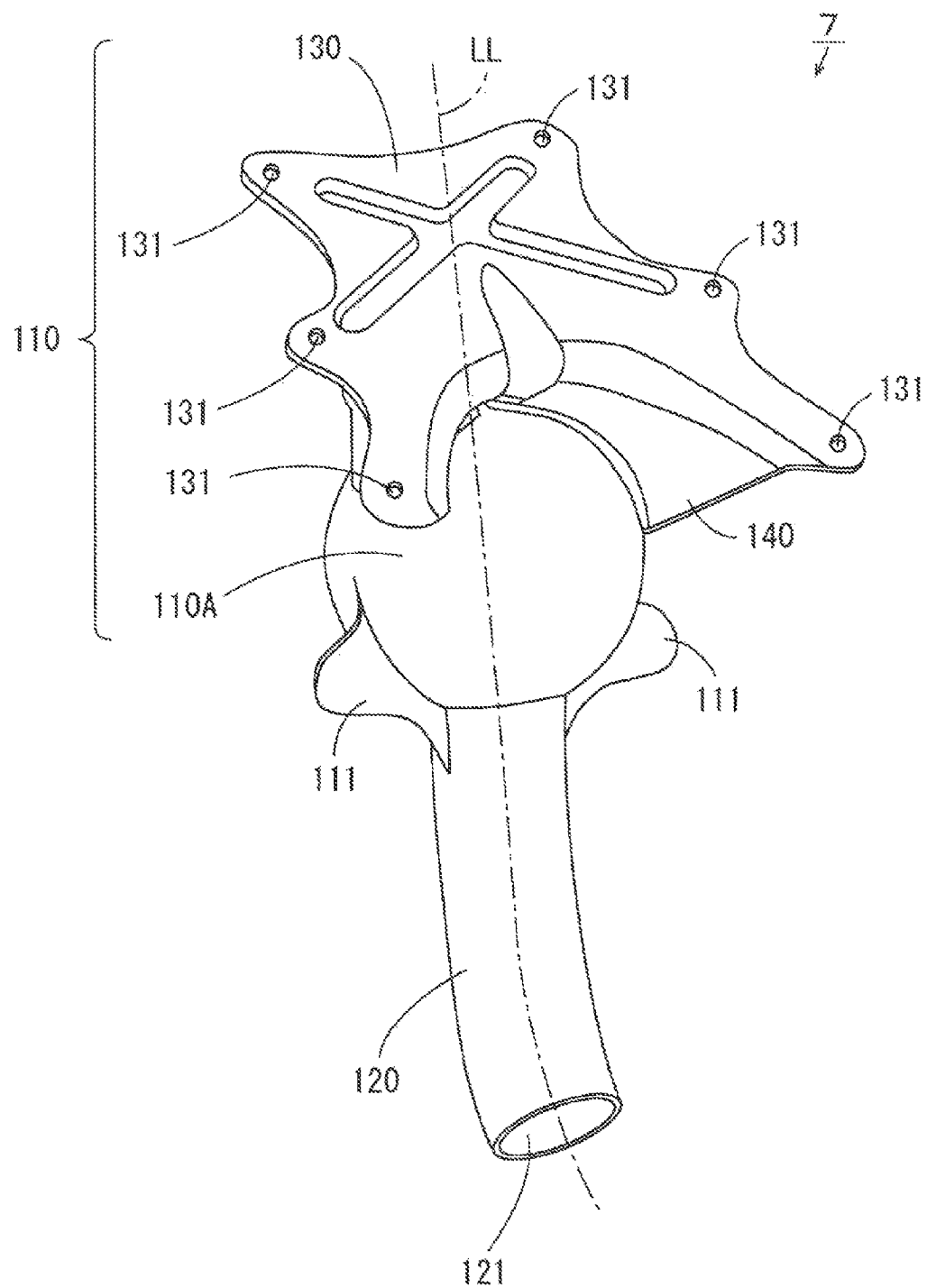

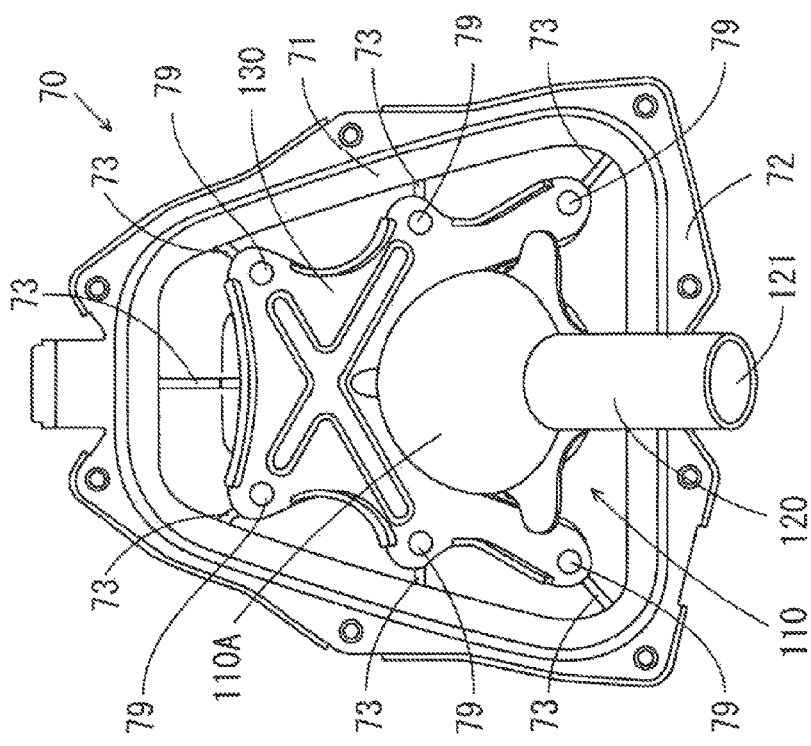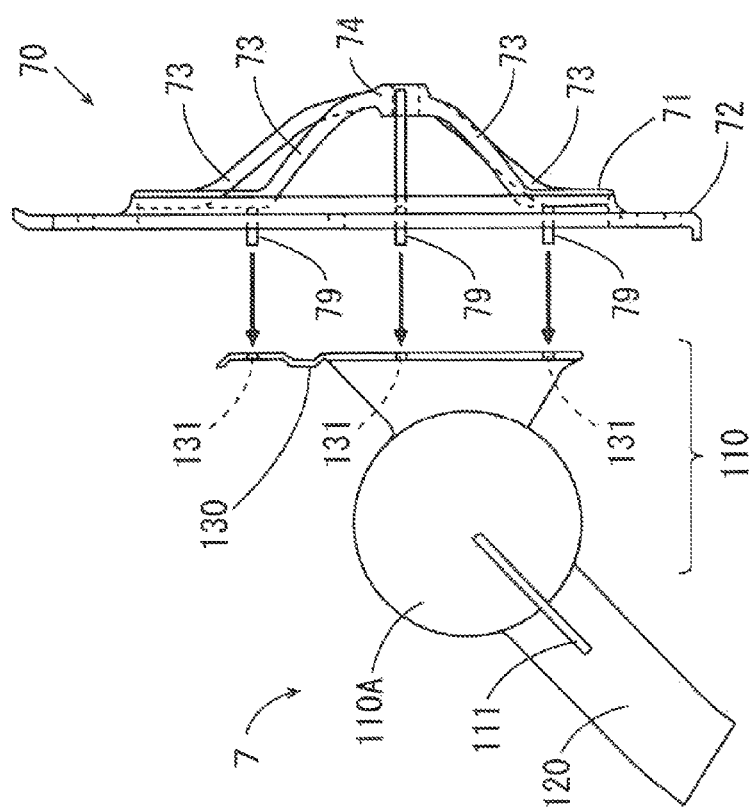

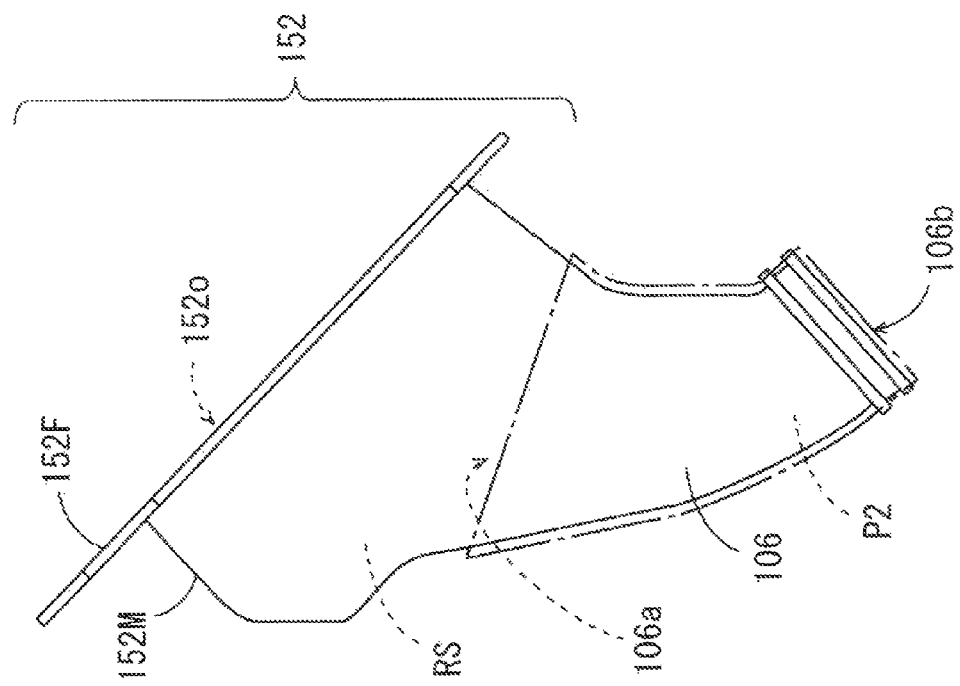
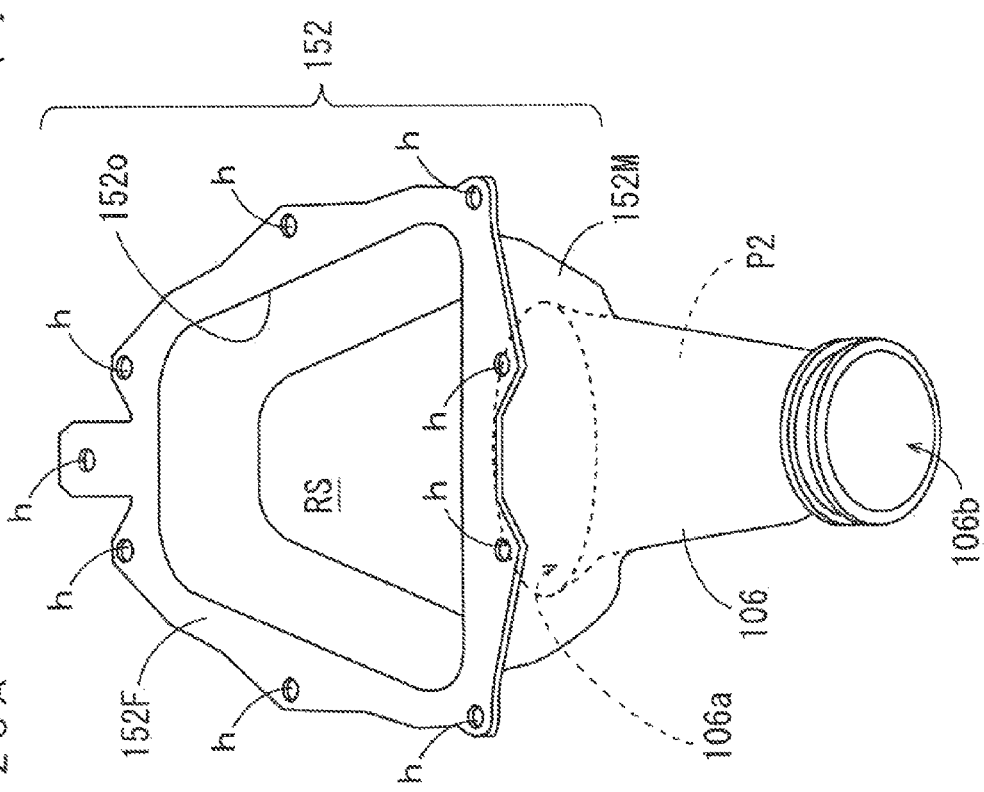

INTAKE NOISE REDUCTION DEVICE AND STRADDLE-TYPE VEHICLE INCLUDING THE SAME

CROSS-REFERENCE TO RELATED APPLICATIONS

This application is based on, and claims priority to, Japanese Patent Application No. 2014-114615, filed on Jun. 3, 2014. The contents of the identified application is entirely incorporated herein by reference.

BACKGROUND OF THE INVENTION

1. Field of the Invention

The present invention relates to an intake noise reduction device and a straddle-type vehicle including the intake noise reduction device.

2. Description of Related Art

A resonator is used to reduce noise generated from a motorcycle. For example, in a motorcycle described in JP 4-306183 A, an air cleaner casing is arranged below a seat, and a resonator is provided between the seat and the air cleaner casing. An inner space of the resonator and an inner space of an air introduction duct of the air cleaner casing communicate with each other via a communication passage (an opening). Thus, aerial vibration of intake noise of an engine transmitted to inside of the air introduction duct resonates with aerial vibration generated in the resonator, and is attenuated.

BRIEF SUMMARY OF THE INVENTION

It is known that the closer an opening of the resonator is to an intake valve positioned downstream of an intake passage, the more sufficiently improved a reduction in intake noise by the resonator is. A method of attachment of the resonator to the outside of an intake funnel that connects the air cleaner casing to an intake port of the engine is considered in order to bring the opening of the resonator closer to the intake valve. However, in this case, it may be difficult to ensure a necessary capacity of the resonator in order to acquire noise reduction effects depending on the layout of surroundings of the intake funnel including the resonator. Further, design may be limited when the resonator can be seen from outside.

An object of the present invention is to provide an intake noise reduction device capable of improving a reduction in intake noise of an engine without limitation of a layout and design of surroundings of an intake system and a straddle-type vehicle including the intake noise reduction device.

(1) An intake noise reduction device according to one aspect of the present invention that leads air to an engine includes an air cleaner, an intake funnel having an upstream opening positioned in the air cleaner, a throttle body provided between a downstream opening of the intake funnel and an intake port of the engine, and a resonator having a chamber portion and a pipe portion, wherein the resonator is arranged in the air cleaner such that an opening end of the pipe portion is inserted into the intake funnel, and a cross sectional area of a passage formed between an inner peripheral surface of the intake funnel and an outer peripheral surface of the pipe portion is set to not less than an opening area of an intake passage of the throttle body opened to a maximum throttle opening.

In the intake noise reduction device, the opening end of the pipe portion of the resonator is inserted into the intake funnel, so that the opening end of the pipe portion of the resonator is close to an intake valve positioned downstream of the intake passage. Thus, noise reduction is improved. Further, the resonator is arranged in the air cleaner, so that limitation of the layout and design of the surroundings of the intake funnel due to the presence of the resonator is prevented.

In this case, the cross sectional area of the passage formed between the inner peripheral surface of the intake funnel and the outer peripheral surface of the pipe portion is set to not less than the opening area of the intake passage of the throttle body opened to the maximum throttle opening, whereby the intake amount in the intake passage of the throttle body is not limited by the pipe portion of the resonator inserted into the intake funnel. Therefore, a reduction in intake performance of the engine is prevented.

As a result, a reduction in intake noise of the engine can be improved without limitation of the layout and design of the surroundings of the intake system.

Further, it is unnecessary to provide a member for preventing deformation and damage of the resonator due to contact with another object in the surroundings of the intake system because of the above-mentioned configuration. Therefore, an increase in number of components is inhibited.

(2) The air cleaner may include a filter element, a casing that stores the filter element, and a support member that supports the filter element on the casing at a position further upstream than the intake funnel, and the chamber portion of the resonator may be provided at a position further downstream than the filter element.

In this case, the chamber portion is provided at a position further downstream than the filter element, so that a space located at a position further downstream than the filter element in the air cleaner can be effectively utilized. Therefore, it is possible to improve the noise reduction without increasing the size of the air cleaner.

(3) The chamber portion of the resonator may have an attachment portion attached to the support member.

The attachment portion of the chamber portion is attached to the support member, so that the passage between the pipe portion and the intake funnel can be ensured with the resonator being supported at the casing.

(4) The attachment portion may include a plate-shape member provided to close part of a space located at a position further downstream than the filter element.

In this case, the plate-shape member functions as a noise insulator. Thus, the intake noise leaking to space located at a position further upstream than the filter element is reduced by the plate-shape member. Therefore, a reduction in intake noise can be more sufficiently improved. Further, the plate-shape member functions as the attachment portion and the noise insulator, so that an increase in number of components is inhibited.

(5) The resonator may have a projection projecting outward of the upstream opening of the intake funnel, and a lower edge of the projection may be formed to extend outward from the pipe portion.

In this case, even when the support of the resonator in the air cleaner comes off, the lower edge of the projection is caught by the upstream opening of the intake funnel. Thus, the chamber portion of the resonator is prevented from closing the upstream opening of the intake funnel.

(6) A straddle-type vehicle according to another aspect of the present invention includes the engine, a drive wheel rotated by motive power generated by the engine, and the above-mentioned intake noise reduction device that leads air to the engine.

The straddle-type vehicle includes the above-mentioned intake noise reduction device. Thus, a reduction in intake noise of the engine can be improved without limitation of the layout and design of the surroundings of the intake system.

Further, an increase in number of components in the surroundings of the intake system is inhibited.

(7) The straddle-type vehicle further includes a head pipe, a main frame that extends rearward of the vehicle from the head pipe, and a down frame that obliquely extends rearward and downward from the head pipe at a position below the main frame, wherein the air cleaner is supported at a front portion of the main frame, the engine is held by the main frame at a position below the air cleaner, and the intake funnel and the throttle body are arranged along the down frame behind the down frame.

The intake funnel and the throttle body are arranged along the down frame behind the down frame, so that a space around the intake funnel is limited. Therefore, it is difficult to attach the resonator to the surroundings of the intake funnel without changing the shape of the down frame.

The above-mentioned configuration causes the resonator to be arranged in the air cleaner, so that it is possible to improve the noise reduction without changing the shape of the down frame and the like.

Other features, elements, characteristics, and advantages of the present invention will become more apparent from the following description of preferred embodiments of the present invention with reference to the attached drawings.

BRIEF DESCRIPTION OF THE SEVERAL VIEWS OF THE DRAWING

FIG. 16 is an external perspective view of a resonator of FIG. 9;

FIGS. 17A and 17B are diagrams for explaining a method of attachment of the resonator to the element support member;

FIGS. 20A and 20B are side views showing a downstream duct and an intake funnel used in a first modified example;

DESCRIPTION OF THE PREFERRED EMBODIMENTS

An intake noise reduction device and a straddle-type vehicle including the intake noise reduction device according to one embodiment of the present invention will be described below with reference to drawings. A motorcycle will be described below as one example of the straddle-type vehicle.

(1) Schematic Configuration of Motorcycle

Figure 1:
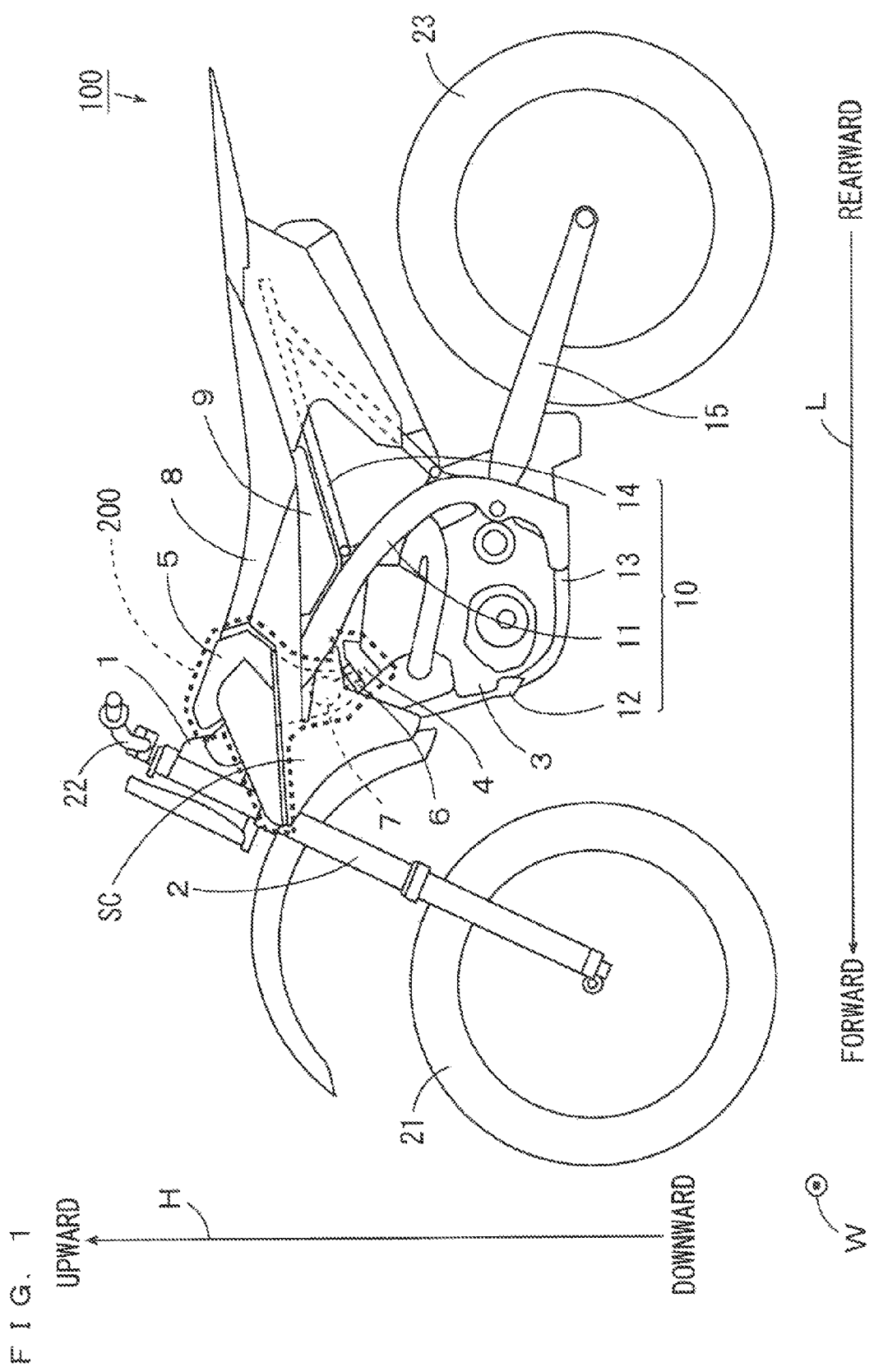
FIG. 1 is a side view of one side of a motorcycle according to one embodiment of the present invention.

FIG. 1 is a side view of one side of the motorcycle according to one embodiment of the present invention. In FIG. 1, the motorcycle 100 standing up to be perpendicular to the road surface is shown. In FIG. 1 and part of subsequent given diagrams, a front-and-rear direction L, a width direction W and a top-and-bottom direction H of the motorcycle 100 are indicated by arrows.

In the following description, a direction in which the arrow is directed in the front-and-rear direction L is referred to as forward, and its opposite direction is referred to as rearward. Further, a direction in which the arrow is directed in the width direction W is referred to as leftward, and its opposite direction is referred to as rightward. Further, a direction in which the arrow is directed in the top-and-bottom direction H is referred to as upward, and its opposite direction is referred to as downward.

Figure 2:
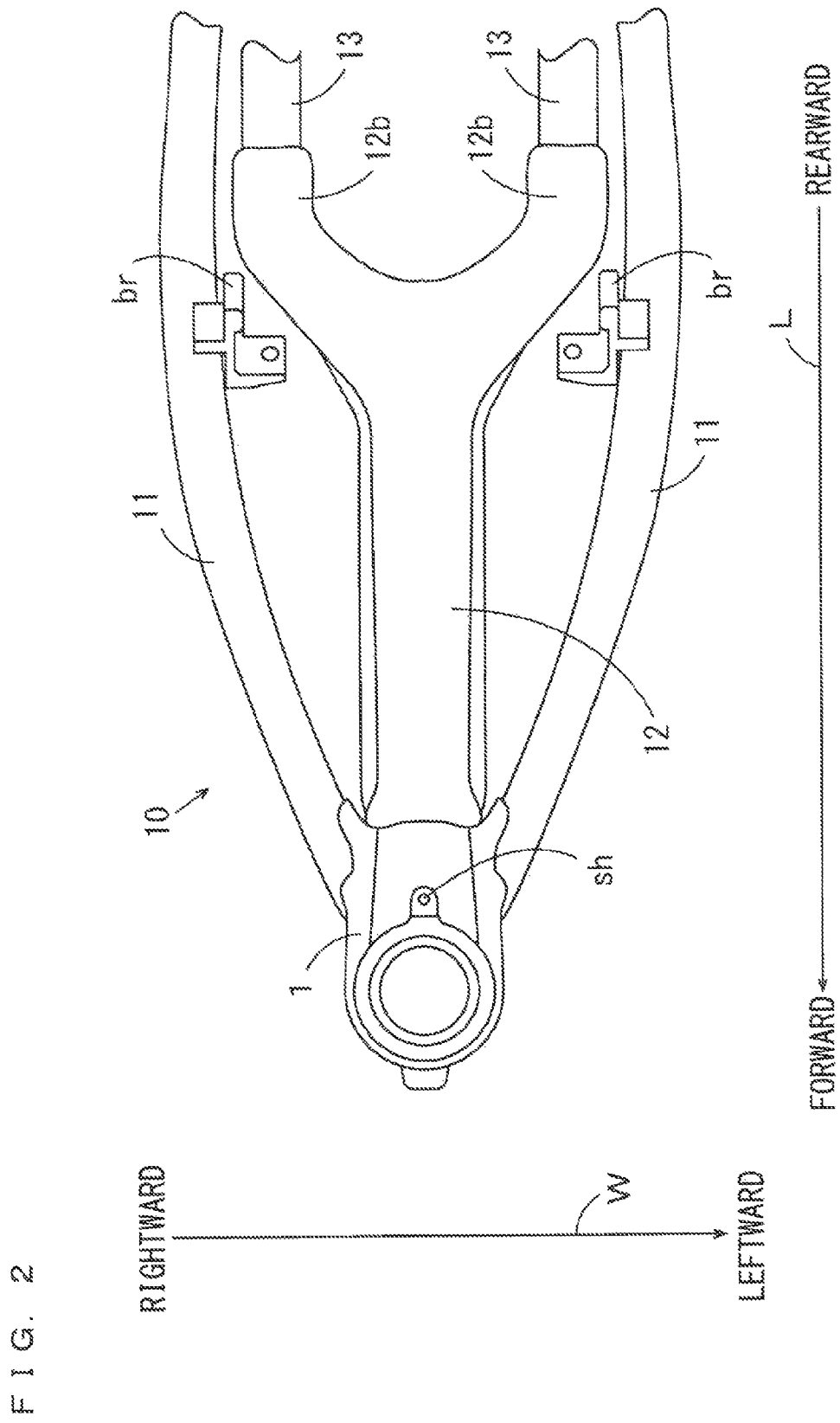
FIG. 2 is a plan view showing a front portion of a vehicle body frame of FIG. 1.

As shown in FIG. 1, the motorcycle 100 includes a head pipe 1 and a vehicle body frame 10. FIG. 2 is a plan view showing a front portion of the vehicle body frame 10 of FIG. 1. As shown in FIGS. 1 and 2, the vehicle body frame 10 includes a pair of left and right main frames 11, one down frame 12, a pair of left and right lower frames 13 and a sub-frame 14.

The pair of main frames 11 obliquely extends rearward and downward from the head pipe 1 as shown in FIG. 1. The rear ends of the main frames 11 are curved downward. The sub-frame 14 extends rearward from rear ends of upper portions of the pair of main frames 11.

The one down frame 12 extends downward from a lower portion of the head pipe 1. The lower end of the down frame 12 is branched into the left and right as shown in FIG. 2. The pair of lower frames 13 is provided to extend rearward from left and right lower ends 12b of the down frame 12. The rear ends of the pair of lower frames 13 are respectively connected to the lower ends of the pair of main frames 11 as shown in FIG. 1.

As shown in FIG. 2, a screw hole sh for fixing a base 51, described below (FIGS. 3 and 4), is formed in a rear portion of the head pipe 1. Further, a pair of brackets br for fixing the base 51, described below (FIGS. 3 and 4), and a fuel tank 9, described below (FIG. 1), is provided at inner edges of the pair of main frames 11.

As shown in FIG. 1, a front fork 2 is provided at the head pipe 1 to be swingable leftward and rightward. A front wheel 21 is rotatably supported at the lower end of the front fork 2. A handle 22 is attached to the upper end of the front fork 2.

An engine 3 is provided in a lower portion of the pair of main frames 11. An air cleaner 5 is supported by the head pipe 1 and the pair of main frames 11 at a position above the engine 3. A throttle body 4 is attached to the engine 3. An intake funnel 6 is provided to connect the throttle body 4 to the air cleaner 5. A resonator 7 is provided inside of the air cleaner 5.

In the present embodiment, the intake noise reduction device 200 is constituted by the throttle body 4, the air cleaner 5, the intake funnel 6 and the resonator 7. In the intake noise reduction device 200, intake noise of the engine 3 is mainly reduced by the resonator 7. Details of the intake noise reduction device 200 will be described below.

In the motorcycle 100 of FIG. 1, a side cover SC is provided to cover part of the intake noise reduction device 200 from outside in the width direction W. Further, a seat 8 is provided to extend rearward from a rear end of an upper portion of the air cleaner 5. The fuel tank 9 is provided at a lower portion of the seat 8. The seat 8 and the fuel tank 9 are supported at the pair of main frames 11 and the sub-frame 14. A rear arm 15 is provided to extend rearward from a lower end of the pair of main frames 11. A rear wheel 23 is rotatably supported at the rear end of the rear arm 15. The rear wheel 23 is rotated by motive power generated by the engine 3.

(2) Details of Intake Noise Reduction Device

Figure 3:
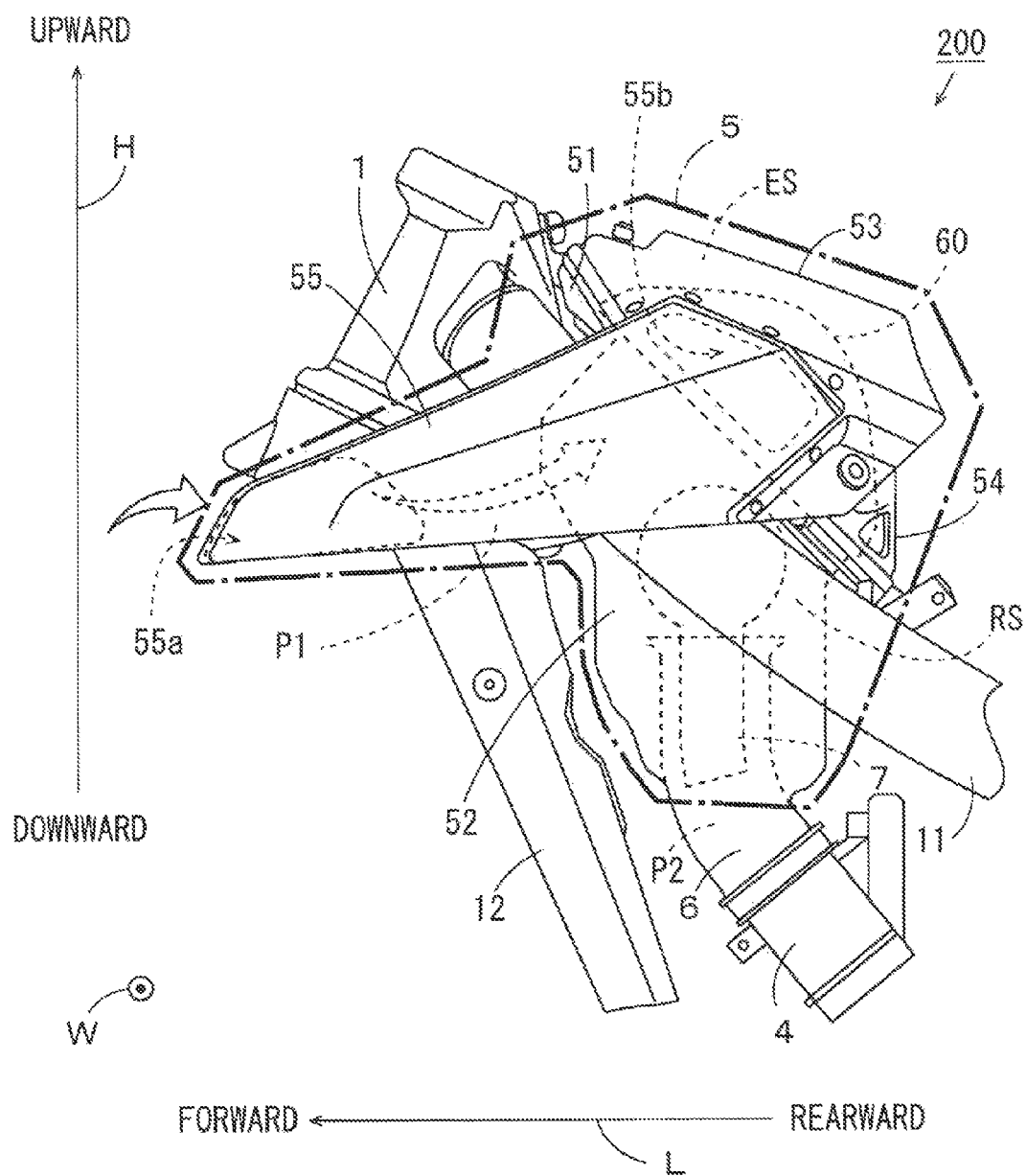
FIG. 3 is a partially enlarged side view of the motorcycle mainly showing an intake noise reduction device.

FIG. 3 is a partially enlarged side view of the motorcycle 100 mainly showing the intake noise reduction device 200. In FIG. 3, the side cover SC of FIG. 1 is not shown. As indicated by a thick one-dot and dash line in FIG. 3, the air cleaner 5 of the intake noise reduction device 200 includes the base 51, a downstream duct 52, an upper cover 53, a rear cover 54, an upstream duct 55 and a filter element 60.

(2-1) Base

Figure 4:
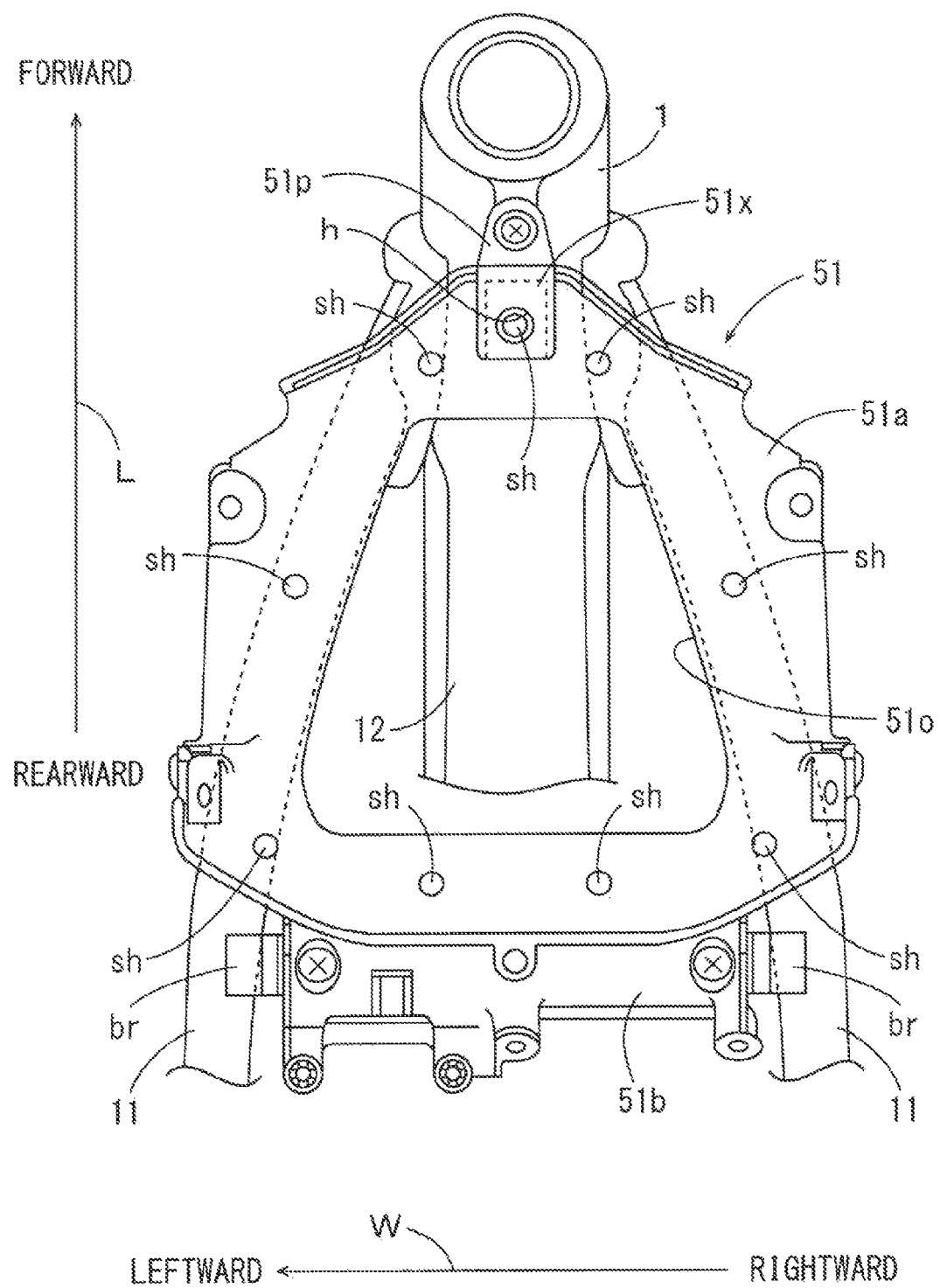
FIG. 4 is a plan view showing a base being supported at a head pipe and a pair of main frames.

The base 51 is supported at the head pipe 1 and the pair of main frames 11. FIG. 4 is a plan view showing the base 51 being supported at the head pipe 1 and the pair of main frames 11.

As shown in FIG. 4, the base 51 includes a main body 51a and a supporter 51b. The main body 51a is a plate-shape member of which a substantially trapezoidal opening 51o is formed in a center portion and arranged on the pair of main frames 11. A projection 51p locally projecting forward is formed at a front portion of the center of the main body 51a. The projection 51p is attached to a rear portion of the head pipe 1 (a portion of the head pipe 1 in which the screw hole sh of FIG. 2 is formed) using a screw. Further, a fixing portion 51x for fixing the front end of the upper cover 53 of FIG. 3 is formed at the front portion of the center of the main body 51a. The fixing portion 51x is formed to project upward, and is formed such that a rectangular cross section extends in the front-and-rear direction L. The rear end of the fixing portion 51x is opened. A through hole h is formed in a substantially center portion of the fixing portion 51x.

Left and right outer edges of the main body 51a are positioned outward of outer edges of the pair of main frames 11 that overlaps with the main body 51a. On the one hand, left and right inner edges of the main body 51a forming the opening 51o substantially overlap with inner edges of the pair of main frames 11. Further, a plurality (nine in the present example) of screw holes sh are formed in the main body 51a to surround the opening 51o.

The supporter 51b is integrally provided at a rear portion of the main body 51a and arranged between the pair of main frames 11. The supporter 51b is attached to the pair of brackets br of FIG. 2 using screws.

(2-2) Downstream Duct and Intake Funnel

Figure 5B:
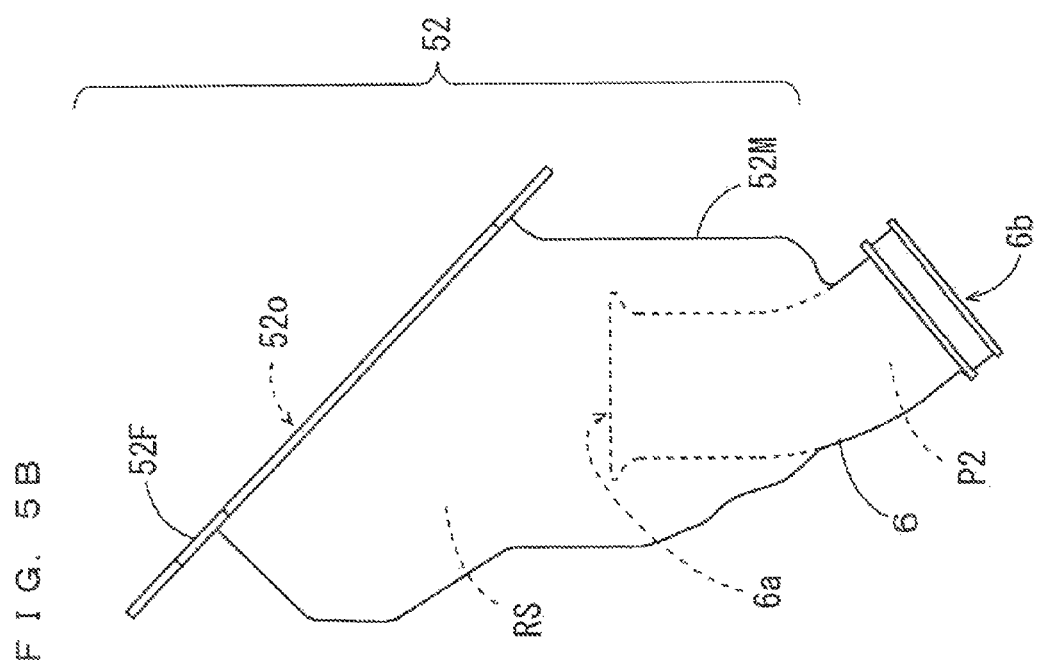
FIG. 5B is a side view of the downstream duct of FIG. 3 as viewed from the left.
Figure 5A:
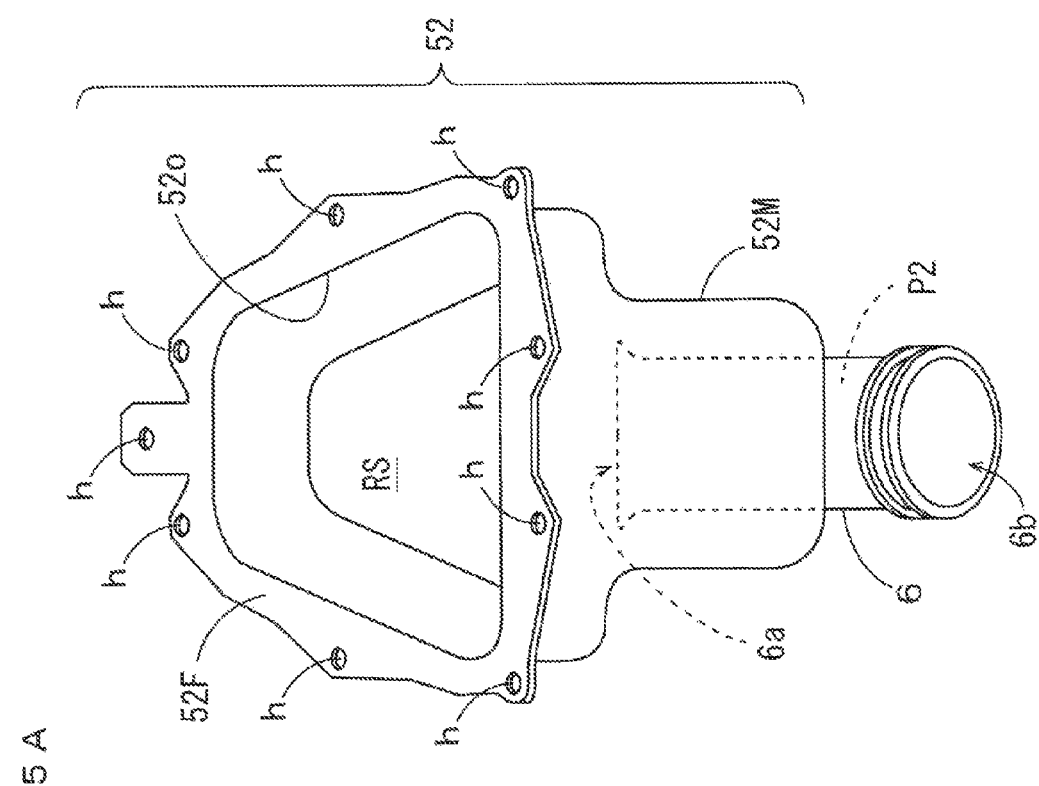
FIG. 5A is a side view of a downstream duct of FIG. 3 as viewed from behind.

FIG. 5A is a side view of the downstream duct 52 of FIG. 3 as viewed from behind, and FIG. 5B is a side view of the downstream duct 52 of FIG. 3 as viewed from the left. As shown in FIGS. 5A, 5B, the downstream duct 52 has a duct main body 52M and a flange portion 52F. The duct main body 52M has a substantially trapezoidal opening 52o at the upper end. The flange portion 52F is formed at the upper end of the duct main body 52M to surround the opening 52o. Further, a plurality of through holes h are formed in the flange portion 52F. The plurality of through holes h of the flange portion 52F correspond to the plurality of screw holes sh of the base 51 of FIG. 4.

An inner space RS of the duct main body 52M is used as a storage space for an intake passage of the engine 3 and the resonator 7 of FIG. 1. The duct main body 52M is formed such that the inner space RS gradually becomes narrower from above towards below.

The intake funnel 6 is integrally formed at the lower end of the duct main body 52M. The intake funnel 6 has an upstream opening 6a at the upper end and a downstream opening 6b at the lower end. The upstream opening 6a is positioned in the inner space RS of the duct main body 52M, and the downstream opening 6b is positioned below the duct main body 52M. The intake funnel 6 forms the intake passage P2 of the engine 3 of FIG. 1.

Figure 6:
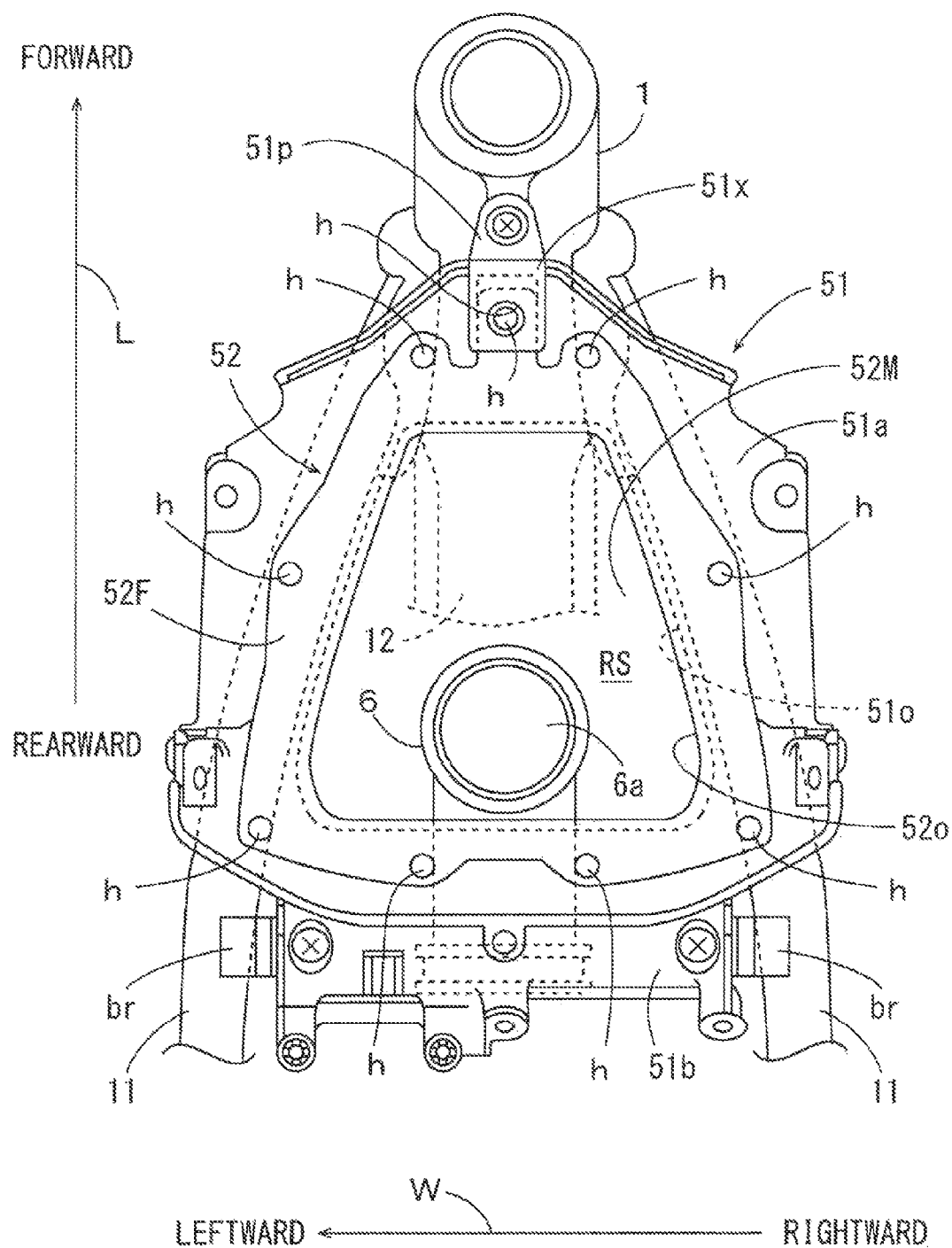
FIG. 6 is a plan view of the downstream duct being attached to the base of FIG. 4.

The downstream duct 52 is attached to the base 51 of FIG. 4. FIG. 6 is a plan view showing the downstream duct 52 being attached to the base 51 of FIG. 4. As shown in FIG. 6, the duct main body 52M of the downstream duct 52 is fitted into the opening 51o of the base 51 from above. In this state, the flange portion 52F is positioned on the main body 51a of the base 51 such that the plurality of through holes h of the flange portion 52F overlap with the plurality of screw holes sh of the base 51 (FIG. 4).

(2-3) Upstream Duct, Upper Cover and Rear Cover

Subsequently, the upper cover 53, the rear cover 54 and the upstream duct 55 of FIG. 3 will be described. As shown in FIG. 3, the upper cover 53 and the rear cover 54 are attached to upper portions of the base 51. Further, the pair of upstream ducts 55 is attached to both left and right side portions of the upper cover 53.

Figure 7:
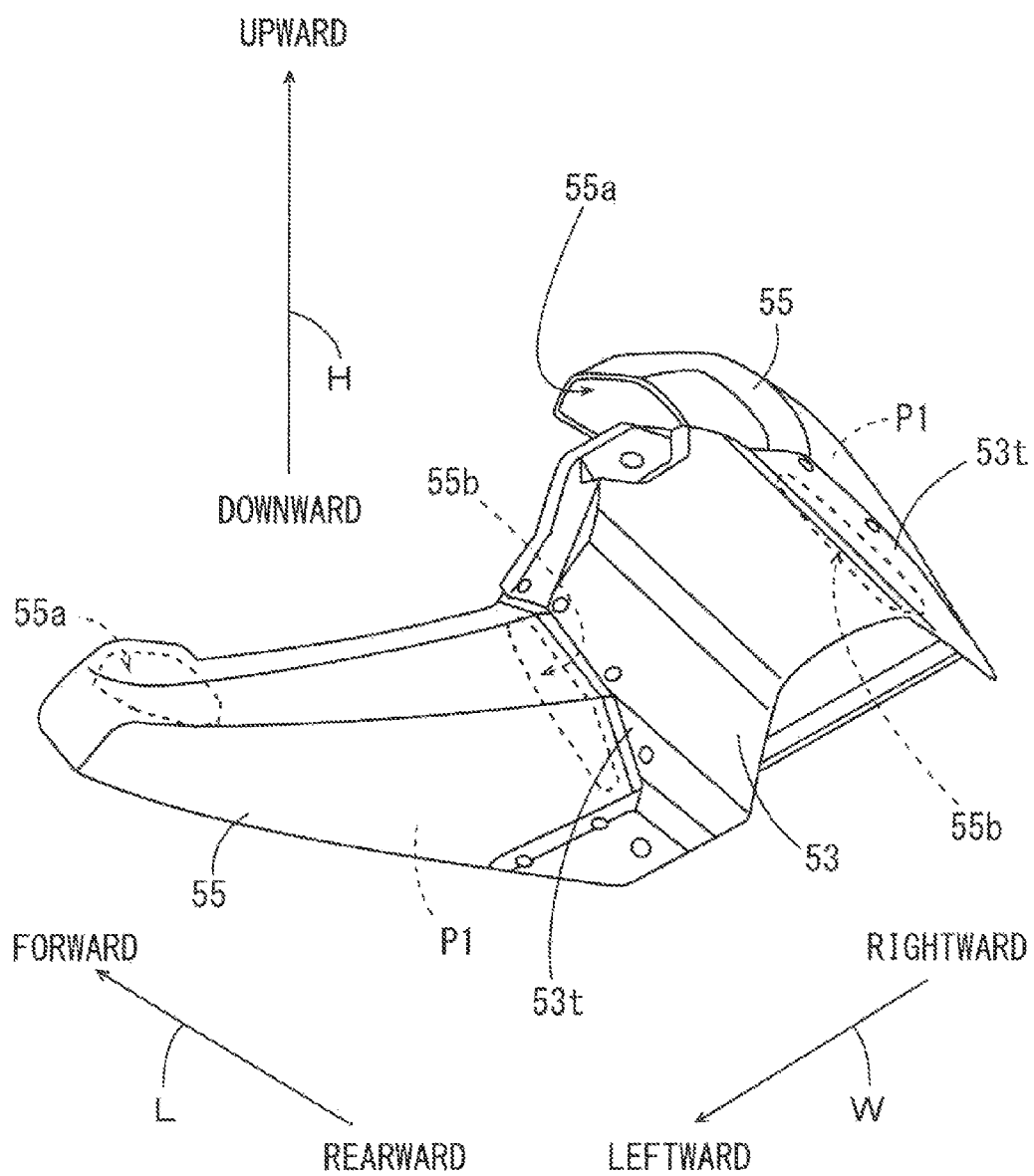
FIG. 7 is an external perspective view of an upper cover and a pair of upstream ducts of FIG. 3 as obliquely viewed from behind and above.
Figure 8:
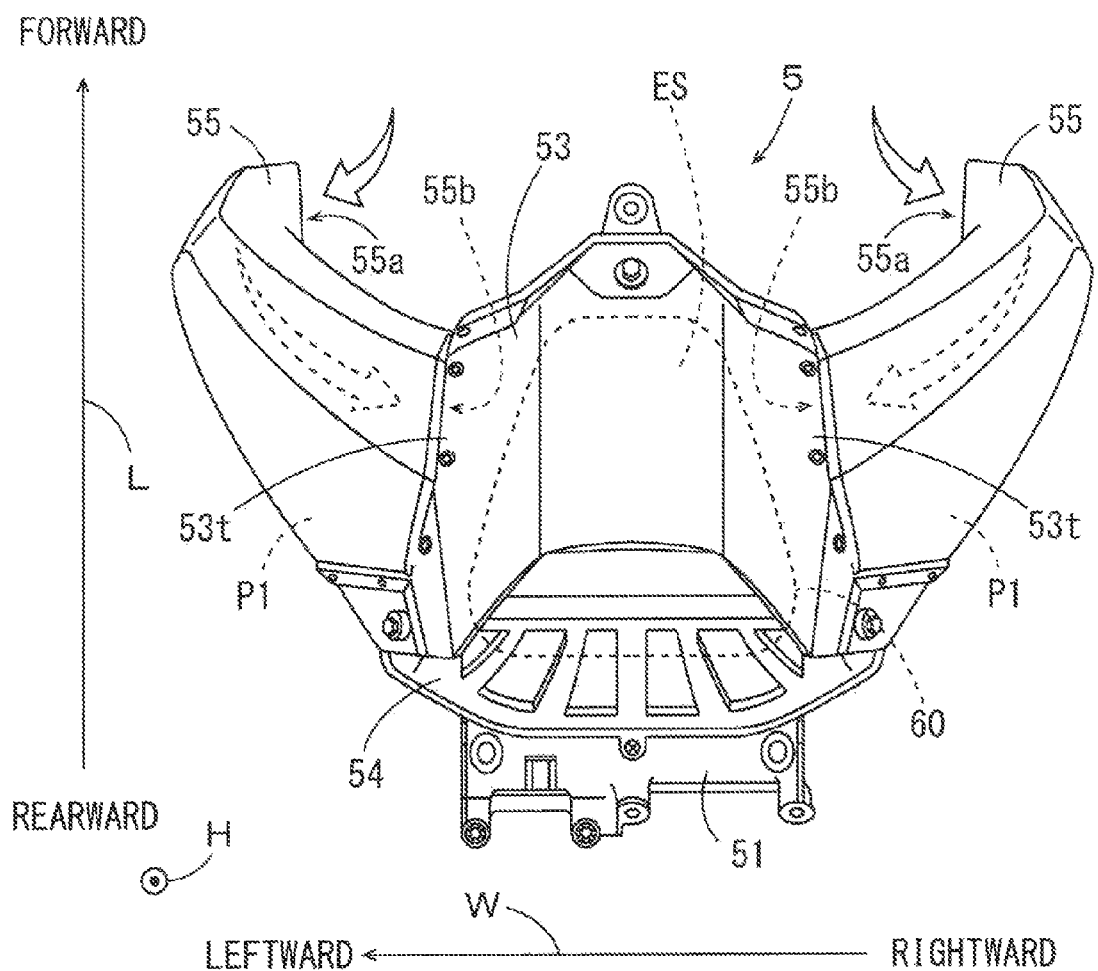
FIG. 8 is a plan view showing the upper cover and a rear cover being attached to the base and the pair of upstream ducts being attached to the upper cover.

FIG. 7 is an external perspective view of the upper cover 53 and the pair of upstream ducts 55 of FIG. 3 as obliquely viewed from behind and above. FIG. 8 is a plan view showing the upper cover 53 and the rear cover 54 being attached to the base 51 and the pair of upstream ducts 55 being attached to the upper cover 53.

The upper cover 53 is a plate-shape member made of metal or resin, for example, and is formed such that a substantially arched cross section extends in the front-and-rear direction L as shown in FIG. 7. Attachment portions 53t for attaching the pair of upstream ducts 55 are formed at both left and right side portions of the upper cover 53.

Each upstream duct 55 is a square pipe-shaped member made of resin that forms the intake passage P1 of the engine 3 of FIG. 1, and has respective first and second openings 55a, 55b at respective upstream and downstream ends. The downstream ends of the pair of upstream ducts 55 are respectively attached to the left and right attachment portions 53t of the upper cover 53. The pair of upstream ducts 55 is curved outward in the width direction W and forward from the downstream ends towards the upstream ends.

As shown in FIG. 8, the upper cover 53 is attached to the upper surface of the base 51, and the rear cover 54 is attached to the base 51 behind the upper cover 53. Thus, a space covered by the upper cover 53 and the rear cover 54 (hereinafter referred to as an element storage space) ES is formed above the base 51.

During the travelling of the motorcycle 100 of FIG. 1, air outside of the air cleaner 5 flows into the intake passage P1 through the first opening 55a of each upstream duct 55 as indicated by solid outlined arrows in FIGS. 3 and 8. Further, the air that has flowed into the intake passages P1 flows into the element storage space ES through the second opening 55b of each upstream duct 55 as indicated by dotted outlined arrows in FIGS. 3 and 8.

Figure 9:
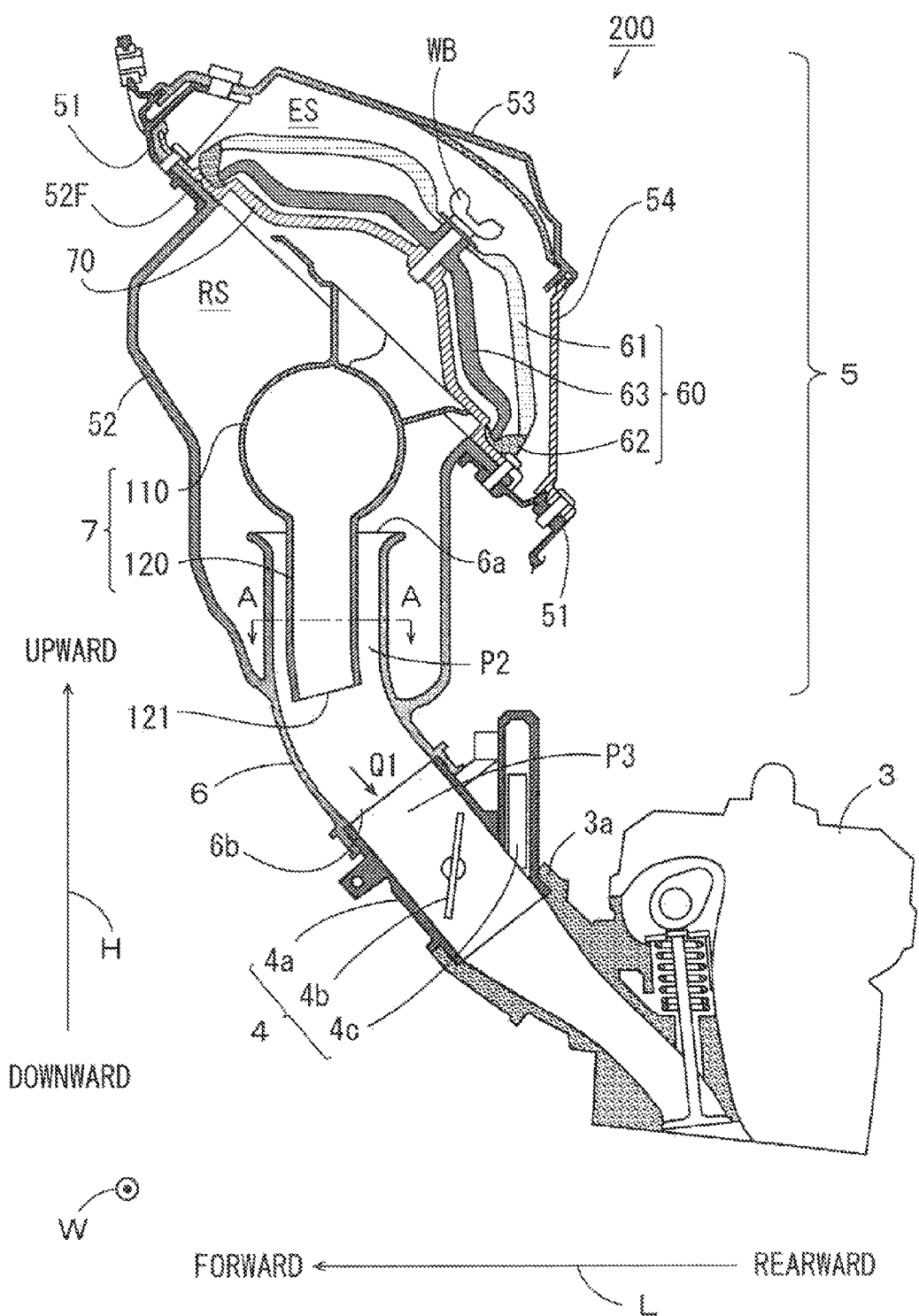
FIG. 9 is a longitudinal cross sectional view mainly showing an inner structure of an air cleaner and a throttle body.

FIG. 9 is a longitudinal cross sectional view mainly showing an inner structure of the air cleaner 5 and the throttle body 4. In FIG. 9, a longitudinal cross sectional view of the air cleaner 5 and the throttle body 4 being cut along a vertical plane passing through the center of the motorcycle 100 in the width direction W is shown. Further, in FIG. 9, part of the engine 3 is cut out. The upstream duct 55 of FIG. 8 is not shown.

As shown in FIG. 9, an element support member 70 is attached to the upper surface of the base 51 with the flange portion 52F of the downstream duct 52 sandwiched therebetween. A filter element 60 is attached to an upper portion of the element support member 70. In this state, the filter element 60 is stored in the element storage space ES. Further, the resonator 7 is attached to a lower portion of the element support member 70. In this state, the resonator 7 is stored in the inner space RS of the downstream duct 52. Details of the filter element 60, the element support member 70 and the resonator 7 will be described below.

The air that has flowed into the element storage space ES from each upstream duct 55 of FIG. 8 flows into the inner space RS of the downstream duct 52 after being cleaned by the filter element 60. Further, the air in the inner space RS is led to an intake port 3a of the engine 3 through intake passages P2, P3 formed by the intake funnel 6 and the throttle body 4.

The throttle body 4 includes a flow path forming pipe 4a, a throttle valve 4b, an injector 4c and a valve actuator (not shown). In the throttle body 4, a degree of an opening of the throttle valve 4b and an injection state of the fuel by the injector 4c are adjusted.

(2-4) Filter Element

As shown in FIG. 9, the filter element 60 of the present example includes an element main body 61, a sealing portion 62 and a frame 63. In the present embodiment, the element main body 61 and the sealing portion 62 are formed of a porous material made of resin, for example. Further, the frame 63 is formed of resin. In the element main body 61 and the sealing portion 62, oil or the like may be impregnated, or does not have to be impregnated.

Figure 10:
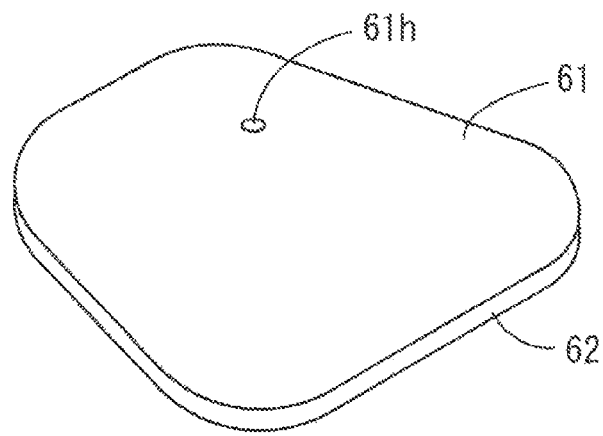
FIG. 10 is an external perspective view of an element main body and a sealing portion of a filter element of FIG. 9.
Figure 11:
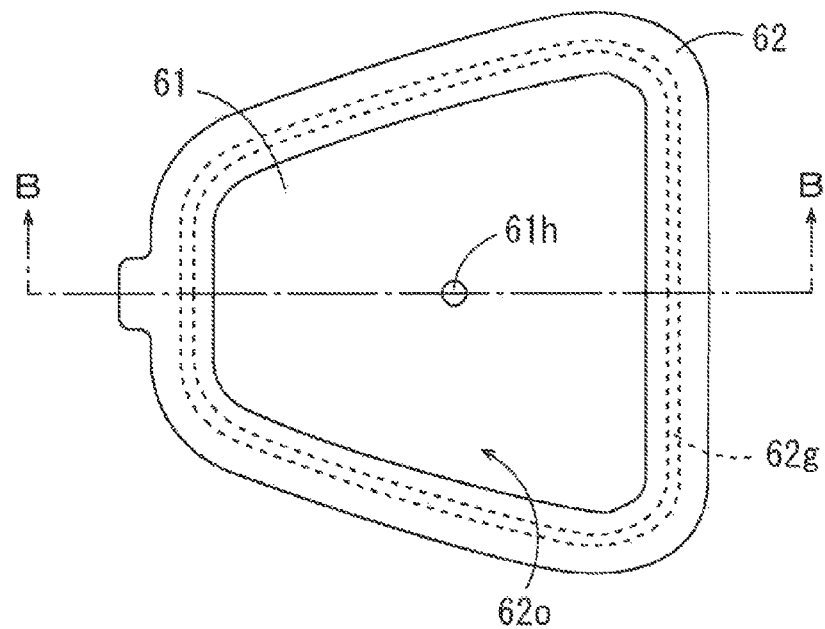
FIG. 11 is a bottom view of the element main body and the sealing portion of FIG. 10 as viewed from below.
Figure 12:
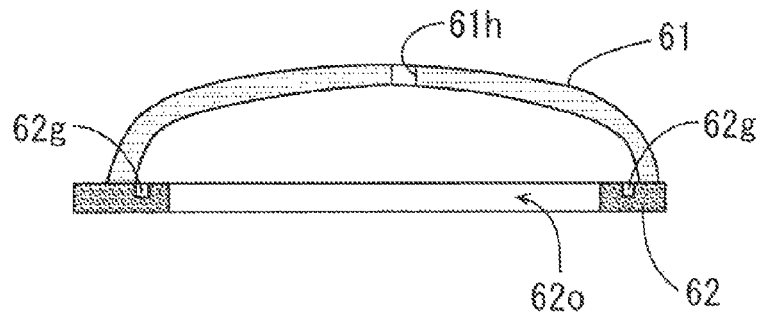
FIG. 12 is a cross sectional view taken along the line B-B of FIG. 11.

FIG. 10 is an external perspective view of the element main body 61 and the sealing portion 62 of the filter element 60 of FIG. 9. FIG. 11 is a bottom view of the element main body 61 and the sealing portion 62 of FIG. 10 as viewed from below. FIG. 12 is a cross sectional view taken along the line B-B of FIG. 11.

As shown in FIGS. 10 and 11, the element main body 61 is formed to be substantially trapezoidal similarly to the opening 52o of the downstream duct 52 of FIG. 6. Further, as shown in FIG. 12, the element main body 61 is curved from an outer edge to a center portion such that the center portion projects upward. A through hole 61h is formed in the center portion of the element main body 61.

As shown in FIGS. 11 and 12, the sealing portion 62 is formed to be strip-shaped to extend along the outer edge (the lower end) of the element main body 61. The sealing portion 62 is bonded to the outer edge of the element main body 61 using an adhesive. An element opening 62o is formed by an inner periphery of the sealing portion 62. A groove 62g is formed in an upper surface portion of the sealing portion 62 positioned inward of the outer edge of the element main body 61.

Figure 13A:
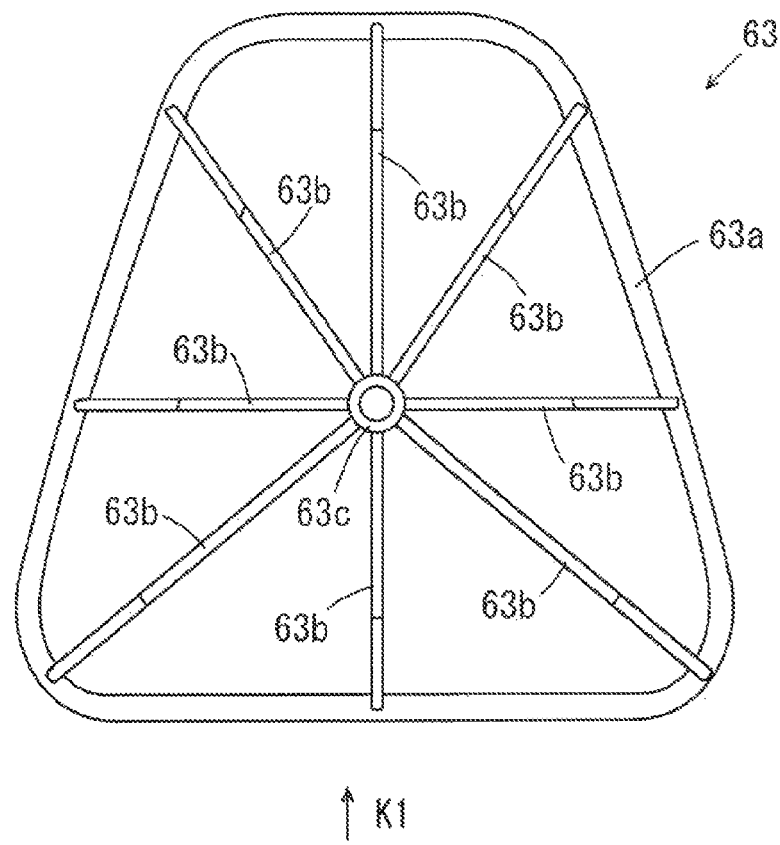
FIG. 13A is a plan view of a frame of the filter element of FIG. 9.
Figure 13B:
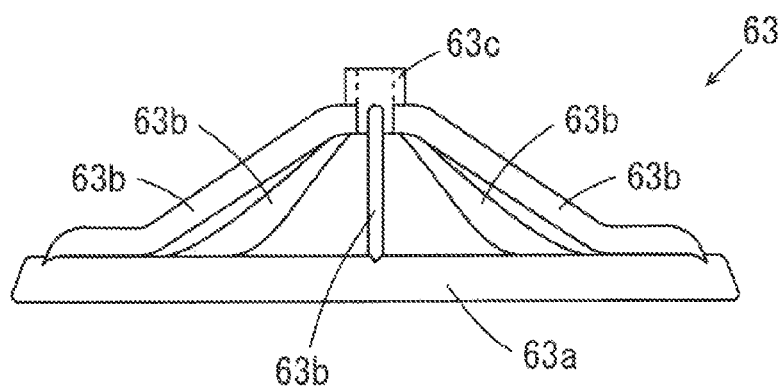
FIG. 13B is a side view of the frame as viewed in a direction of an arrow K1 of FIG. 13A.

FIG. 13A is a plan view of the frame 63 of the filter element 60 of FIG. 9, and FIG. 13B is a side view of the frame 63 as viewed in a direction of an arrow K1 of FIG. 13A.

As shown in FIGS. 13A, 13B, the frame 63 includes an outer edge frame 63a, a plurality (eight in the present example) of inner frames 63b and a guide pipe 63c. The outer edge frame 63a is formed to draw a substantial trapezoid. The eight inner frames 63b are formed at equal angular intervals to extend inward of the outer edge frame 63a and upward from eight positions at the outer edge frame 63a. Inner ends of the eight inner frames 63b are connected to a lower portion of an outer peripheral surface of the guide pipe 63c extending in the top-and-bottom direction.

The frame 63 of FIGS. 13A, 13B is stored in an inner space of the element main body 61 through the element opening 62o of FIG. 11. In this case, the lower end of the outer edge frame 63a of the frame 63 is fitted into the groove 62g of the sealing portion 62. Further, an upper portion of the guide pipe 63c of the frame 63 is inserted into the through hole 61h of the element main body 61. In this manner, the frame 63 is provided inside of the element main body 61, so that the shape of the element main body 61 is kept constant.

(2-5) Element Support Member

Figure 14B:
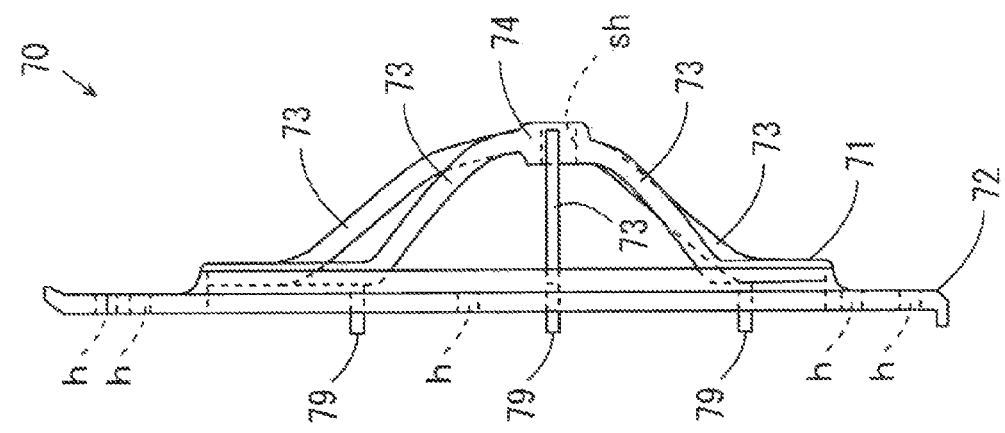
FIG. 14B is a side view of the element support member as viewed in a direction of an arrow K2 of FIG. 14A.
Figure 14A:
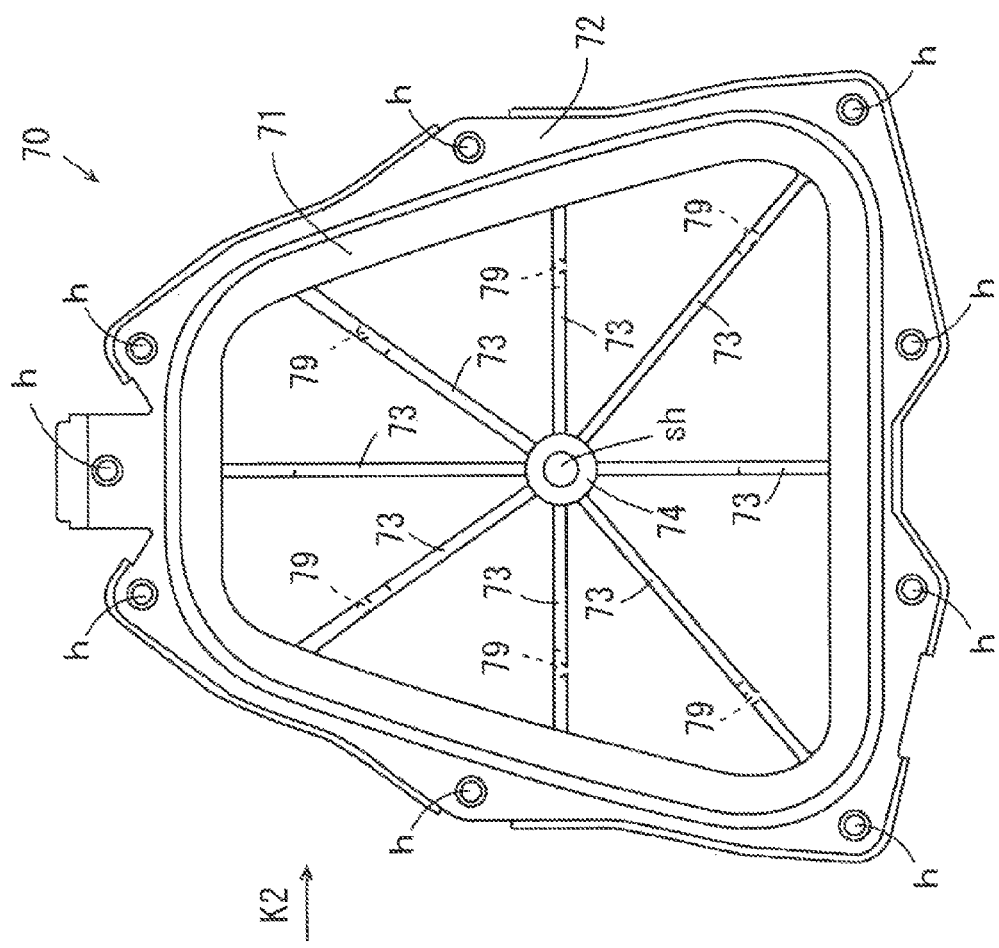
FIG. 14A is a plan view of an element support member of FIG. 9.

FIG. 14A is a plan view of the element support member 71 of FIG. 9, and FIG. 14B is a side view of the element support member 70 as viewed in a direction of an arrow K2 of FIG. 14A. As shown in FIGS. 14A, 14B, the element support member 70 includes an element supporter 71, a flange portion 72, a plurality (eight in the present example) of inner frames 73 and a fixing portion 74. The element supporter 71 is formed to draw a substantial trapezoid. Further, the element supporter 71 is formed to have a constant width such that the outer edge frame 63a of FIGS. 13A, 13B can be supported from below by the element supporter 71.

The flange portion 72 is formed to surround the element supporter 71. A plurality of through holes h are formed in the flange portion 72. The plurality of through holes h of the flange portion 72 correspond to the plurality of screw holes sh of the base 51 of FIG. 4.

As shown in FIGS. 14A, 14B, the eight inner frames 73 are formed at equal angular intervals to extend inward of the element supporter 71 and upward from eight positions at the element supporter 71. The inner ends of the eight inner frames 73 are connected to the fixing portion 74. A screw hole sh extending in the top-and-bottom direction H is formed in a center portion of the fixing portion 74.

At part of the inner frame 73 (six in the present example) of the eight inner frames 73, rivet pins 79 are respectively formed at portions spaced apart from an inner edge of the element supporter 71 by a predetermined distance. Each rivet pin 79 is formed to extend downward from each inner frame 73. Details of the rivet pin 79 will be described below.

The filter element 60 is placed on an upper portion of the above-mentioned element support member 70, and a wing screw WB (see FIG. 9, and FIG. 15 that is described below) is attached to the screw hole sh of the fixing portion 74 of FIGS. 14A, 14B through the guide pipe 63c of FIGS. 13A, 13B. Further, the flange portion 72 of the element support member 70 is placed on the flange portion 52F of the downstream duct 52 of FIG. 6. In this state, screws are respectively attached to the plurality of screw holes sh of the base 51 of FIG. 4 through the plurality of through holes h of the downstream duct 52 and element support member 70.

Figure 15:
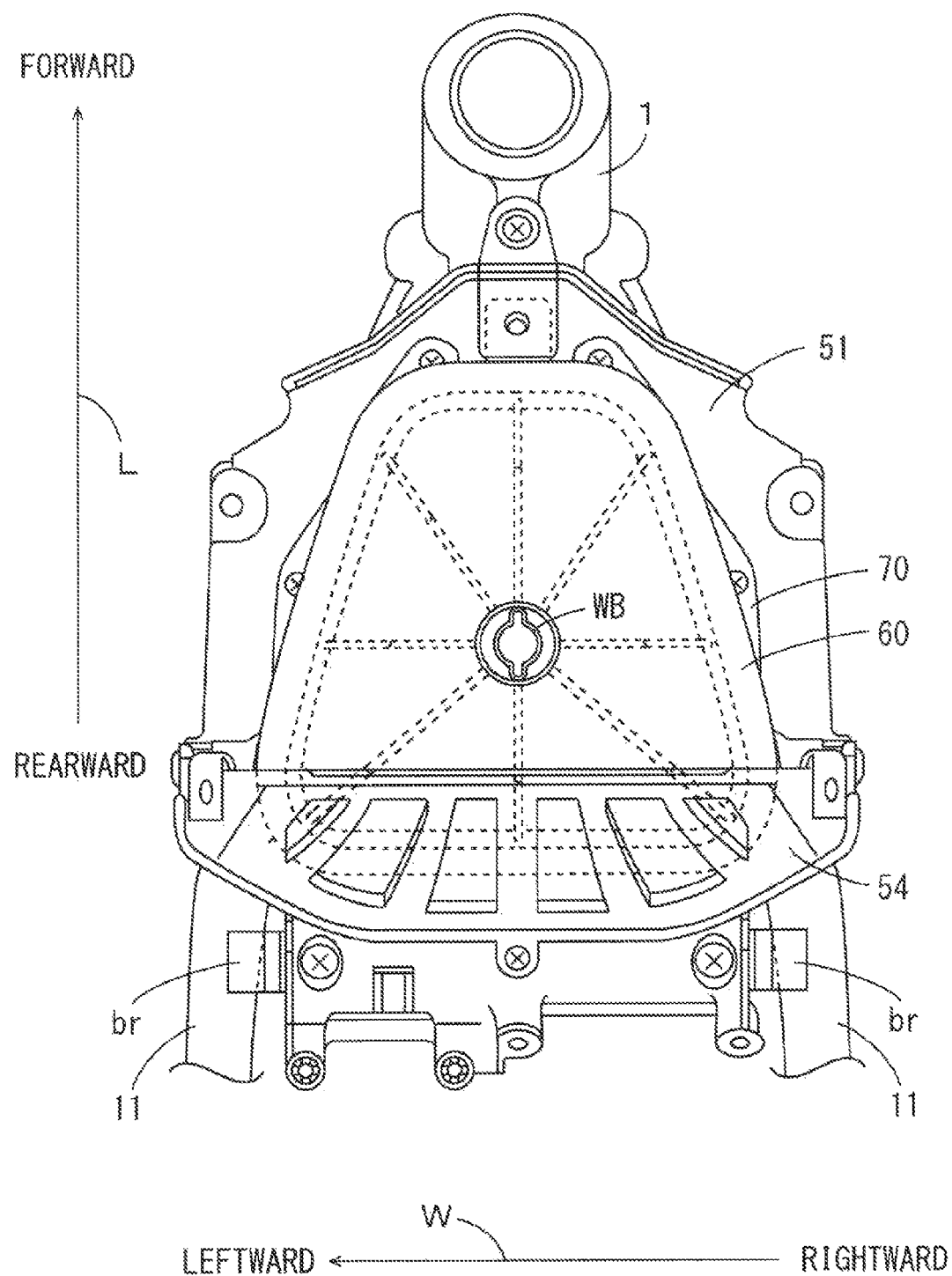
FIG. 15 is a plan view showing the element support member, the filter element and the rear cover being attached to an upper surface of the base of FIG. 6.

FIG. 15 is a plan view showing the element support member 70, the filter element 60 and the rear cover 54 being attached to the upper surface of the base 51 of FIG. 6. The element support member 70 and the filter element 60 are attached to the upper surface of the base 51 as described above, so that the opening 52o of the downstream duct 52 of FIG. 6 is closed by the filter element 60 as shown in FIG. 15. Thus, air that is not cleaned by the filter element 60 is prevented from entering the downstream duct 52.

In the element support member 70, a metal mesh may be provided to cover an inner region of the element supporter 71. Thus, foreign matters such as small stones are prevented from entering the downstream duct 52.

(2-6) Resonator

FIG. 16 is an external perspective view of the resonator 7 of FIG. 9. As shown in FIG. 16, the resonator 7 has a chamber portion 110 and a pipe portion 120 that are integrally formed. Further, the chamber portion 110 has a spherical chamber 110A, a plate-shape member 130 and a supporter 140.

The pipe portion 120 is provided to extend downward from the lower end of the chamber 110A. An inner space of the chamber 110A and an inner space of the pipe portion 120 communicate with each other. The lower end of the pipe portion 120 constitutes an opening end 121 opened to the outside of the chamber 110A and pipe portion 120. A pair of projections 111 is formed to project to one side and the opposite side from a lower portion of the chamber 110A to an upper portion of the pipe portion 120.

The measurements of the chamber 110A and pipe portion 120 are set to correspond to a frequency of the noise to be reduced (the intake noise of the engine 3). In the present example, the measurements of the chamber 110A and pipe portion 120 are set such that the intake noise of about 250 Hz to about 350 Hz is reduced, that is, the measurements of the chamber 110A and pipe portion 120 are set such that a resonant frequency of the resonator 7 coincides with the frequency of the intake noise.

The plate-shape member 130 is provided above the chamber 110A and is provided to intersect with an extending line LL of a central axis of the pipe portion 120. The supporter 140 is provided to extend upward from the chamber 110A and supports the plate-shape member 130 at a position above the chamber 110A. Six through holes 131 respectively corresponding to the six rivet pins 79 of FIG. 14A are formed in the plate-shape member 130.

As described above, the resonator 7 is attached to the element support member 70 of FIGS. 14A, 14B. FIGS. 17A, 17B are diagrams for explaining a method of attachment of the resonator 7 to the element support member 70.

A side view of the element support member 70 and the resonator 7 is shown in FIG. 17A. As indicated by a thick solid arrow in FIG. 17A, when the resonator 7 is attached to the element support member 70, each rivet pin 79 extending downward from the element support member 70 is inserted into the corresponding through hole 131 of the resonator 7. Thereafter, a portion, of each rivet pin 79, projecting downward from the plate-shape member 130 is melted by ultrasonic caulking. Thus, the plate-member 130 of the resonator 7 is fixed to the plurality of inner frames 73 of the element support member 70.

In FIG. 17B, a bottom view of the element support member 70 to which the resonator 7 is attached as viewed from below is shown. As shown in FIG. 17B, with the resonator 7 being attached to the element support member 70, an opening that constitutes part of the intake passage is formed between an outer edge of the plate-shape member 130 and the inner edge of the element supporter 71. This opening area is sufficiently larger than an opening area, described below, in the intake passage P3 of the throttle body 4.

As described above using FIG. 15, the element support member 70 of FIG. 17B is attached to the upper surface of the base 51 of FIG. 6. Thus, as shown in FIG. 9, the resonator 7 is stored in the inner space RS of the downstream duct 52 while being supported at the element support member 70.

Figure 18:
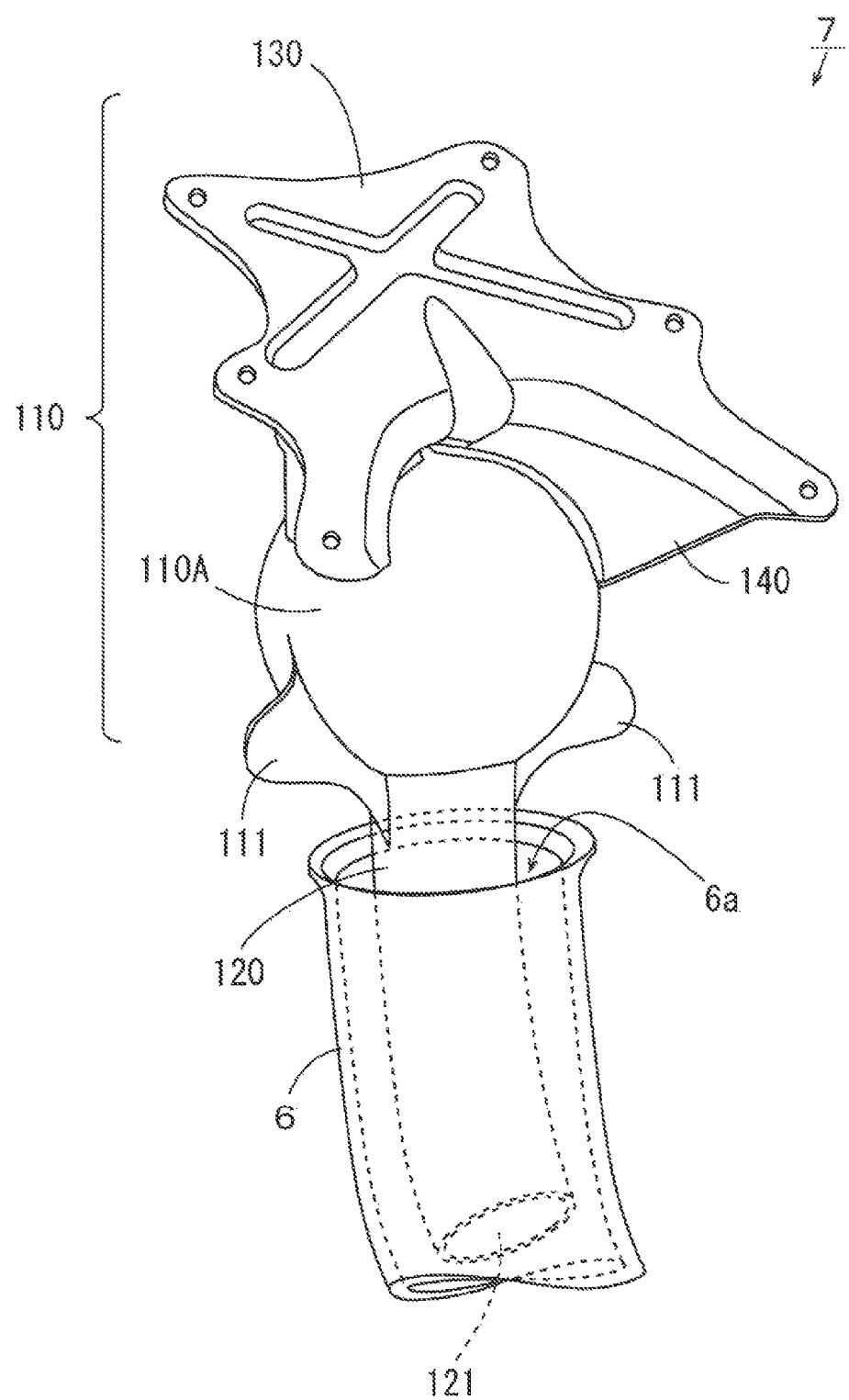
FIG. 18 is an external perspective view showing a positional relationship between the resonator and an intake funnel.

A positional relationship between the resonator 7 and the intake funnel 6 will be described. FIG. 18 is an external perspective view showing the positional relationship between the resonator 7 and the intake funnel 6. The resonator 7 is stored in the inner space RS of FIG. 9 while being supported at the element support member 70, so that the opening end 121 of the pipe portion 120 is inserted into the intake funnel 6 as shown in FIG. 18. In this case, the opening end 121 of the pipe portion 120 can be brought close to the throttle body 4 of FIG. 9. Thus, a reduction in intake noise of the engine 3 by the resonator 7 is improved.

If the support of the resonator 7 comes off, the chamber 110A of the resonator 7 falls towards the upstream opening 6a of the intake funnel 6. Even in such a case, lower edges of the projections 111 of the present example are formed to project outward of the upstream opening 6a. Thus, the projections 111 of the resonator 7 that has fallen are caught by the upstream opening 6a of the intake funnel 6. Therefore, the chamber 110A is prevented from closing the upstream opening 6a of the intake funnel 6.

Figure 19A:
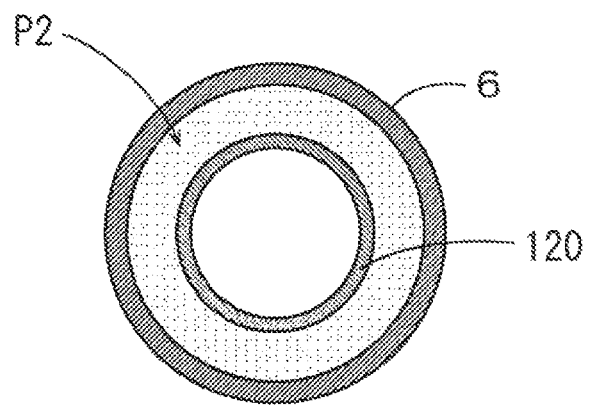
FIG. 19A is a cross sectional view taken along the line A-A of FIG. 9.
Figure 19B:
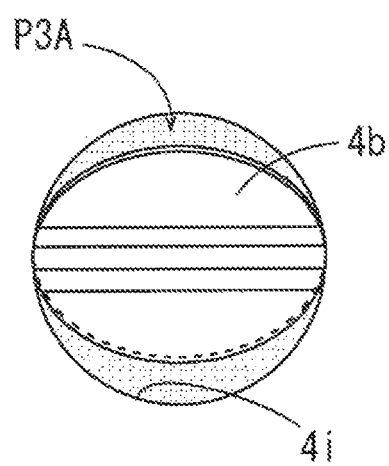
FIG. 19B is a diagram showing an inner space of the throttle body as viewed in a direction of an arrow Q1 of FIG. 9.

(2-7) Relationship between Cross Sectional Area of Intake Passage of Intake Funnel and Opening Area of Intake Passage of Throttle Body FIG. 19A is a cross sectional view taken along the line A-A of FIG. 9, and FIG. 19B is a diagram showing an inner space of the throttle body 4 as viewed in a direction of an arrow Q1 of FIG. 9. In FIG. 19A, a cross section of the intake passage P2 is indicated by the dotted pattern. In FIG. 19B, an inner peripheral surface of the flow path forming pipe 4a of FIG. 9 is indicated by a reference numeral 4i, and an opening P3A formed when the throttle valve 4b is opened is indicated by the dotted pattern.

In the intake noise reduction device 200 according to the present embodiment, the pipe portion 120 of the resonator 7 is inserted into the intake passage P2 of the intake funnel 6 as described above. Therefore, as shown in FIG. 19A, a cross sectional area of the intake passage P2 is formed between an inner peripheral surface of the intake funnel 6 and an outer peripheral surface of the pipe portion 120 is smaller by a cross sectional area of the pipe portion 120 than the cross sectional area of the intake passage P2 of when the pipe portion 120 is not inserted. In other words, the pipe portion 120 reduces the cross-sectional area of the intake passage P2 by an amount corresponding to a cross-sectional area of the pipe portion 120.

Whereas, in the throttle body 4, the opening of the throttle valve 4b is adjusted according to an operation amount of an accelerator by a rider, for example. The rider opens the accelerator to the maximum, so that the throttle valve 4b is opened to a predetermined maximum throttle opening as shown in FIG. 19B.

In this case, when the cross sectional area of the intake passage P2 between the intake funnel 6 and the pipe portion 120 is smaller than the opening area of the intake passage P3 of the throttle body 4 opened to the maximum throttle opening, a sufficient amount of air cannot be led to the engine 3. Therefore, intake performance of the engine 3 is reduced.

Thus, in the present embodiment, the measurements of each constituent element are set such that a minimum value of the cross sectional area of the intake passage P2 between the intake funnel 6 and the pipe portion 120 is not less than the opening area of the intake passage P3 of the throttle body 4 opened to the maximum throttle opening.

(3) Effects

In the above-mentioned intake noise reduction device 200, because the opening end 121 of the pipe portion 120 of the resonator 7 is inserted into the intake funnel 6, the opening end 121 of the pipe portion 120 of the resonator 7 is positioned close to the intake passage P3 of the throttle body 4. That is, the opening end 121 is positioned closer to the intake passage P3 of the throttle body 4 than the upstream opening 6a. Thus, a reduction in intake noise of the engine 3 is improved. Further, because the resonator 7 is arranged in the inner space RS of the downstream duct 52, limitation of the layout and design of surroundings of the intake funnel 6 by the presence of the resonator 7 is prevented.

Further, as described above, the cross sectional area of the intake passage P2 formed between the inner peripheral surface of the intake funnel 6 and the outer peripheral surface of the pipe portion 120 is set to not less than the opening area of the intake passage P3 of the throttle body 4. Thus, an intake amount in the intake passage P3 of the throttle body 4 is not limited by the pipe portion 120 of the resonator 7 inserted into the intake funnel 6. Therefore, a reduction in intake performance of the engine 3 is prevented.

As a result, a reduction in intake noise of the engine 3 can be improved without the limitation of the layout and design of the surroundings of an intake system.

Further, the above-mentioned configuration enables a space located at a position further downstream than the filter element 60 inside of the air cleaner 5 to be effectively utilized by the resonator 7, whereby it is possible to improve the noise reduction without increasing the size of the air cleaner 5.

Further, it is not necessary to provide a member for preventing deformation and damage of the resonator 7 in the surroundings of the intake system. Therefore, an increase in number of components is inhibited.

As described above, the resonator 7 has the plate-shape member 130. The plate-shape member 130 is provided to close part of the inner space RS below the base 51. In this case, the intake noise leaking to the inner space RS of the downstream duct 52 through the throttle body 4 and the intake funnel 6 from the engine 3 is reduced by the plate-shape member 130. Thus, a reduction in intake noise can be more sufficiently improved. Further, the plate-shape member 130 functions as an attachment portion for attaching the resonator 7 to the element support member 70 and a noise reduction member. Therefore, an increase in number of components is inhibited.

In the above-mentioned motorcycle 100, the downstream duct 52 is attached to the base 51, and the lower end of the intake funnel 6 is connected to the throttle body 4. The downstream duct 52, the intake funnel 6 and the throttle body 4 are arranged along the down frame 12 behind the down frame 12. In this manner, even when a space around the intake funnel 6 is limited, the resonator 7 is stored in the downstream duct 52, so that it is possible to improve the noise reduction without changing the shape of the down frame 12.

(4) First Modified Example

The intake noise reduction device 200 may include a downstream duct and an intake funnel that are described below instead of the downstream duct 52 and the intake funnel 6 of FIGS. 5A, 5B.

FIGS. 20A, 20B are side views showing the downstream duct and the intake funnel used in the first modified example. The side view of a downstream duct 152 used in the first modified example as viewed in one direction (rearward) is shown in FIG. 20A, and the side view of the downstream duct 152 used in the first modified example as viewed in another direction (leftward) is shown in FIG. 20B. The side views of FIGS. 20A, 20B respectively correspond to the side views of FIGS. 5A, 5B.

As shown in FIGS. 20A, 20B, in an intake funnel 106 of the present example, a ratio of an opening area of an upstream opening 106a to an opening area of a downstream opening 106b is set larger than a ratio of the opening area of the upstream opening 6a to the opening area of the downstream opening 6b of the intake funnel 6 of FIGS. 5A, 5B. Further, the opening area of the downstream opening 106b of the intake funnel 106 is set larger than the opening area of downstream opening 6b of the intake funnel 6 of FIGS. 5A, 5B. Further, in the intake funnel 106 of the present example, a boundary portion between the downstream duct 152 and the intake funnel 106 is formed to be smooth. The intake funnel 106 and downstream duct 152 may be integrally formed so that the boundary therebetween is smooth. In some embodiments, the intake funnel 106 is formed so that the intake funnel 106 is in direct contact with the downstream duct 152.

Thus, an amount of air that can be led to the engine 3 by the intake funnel 106 is larger than an amount of air that can be led to the engine 3 by the intake funnel 6 of FIGS. 5A, 5B. In FIG. 20A, the upper end of the intake funnel 106 is indicated by a dotted line such that the boundary portion between the downstream duct 152 and the intake funnel 106 can be clearly identified. Further, in FIG. 20B, the intake funnel 106 is surrounded by a one-dot and dash line.

Figure 21:
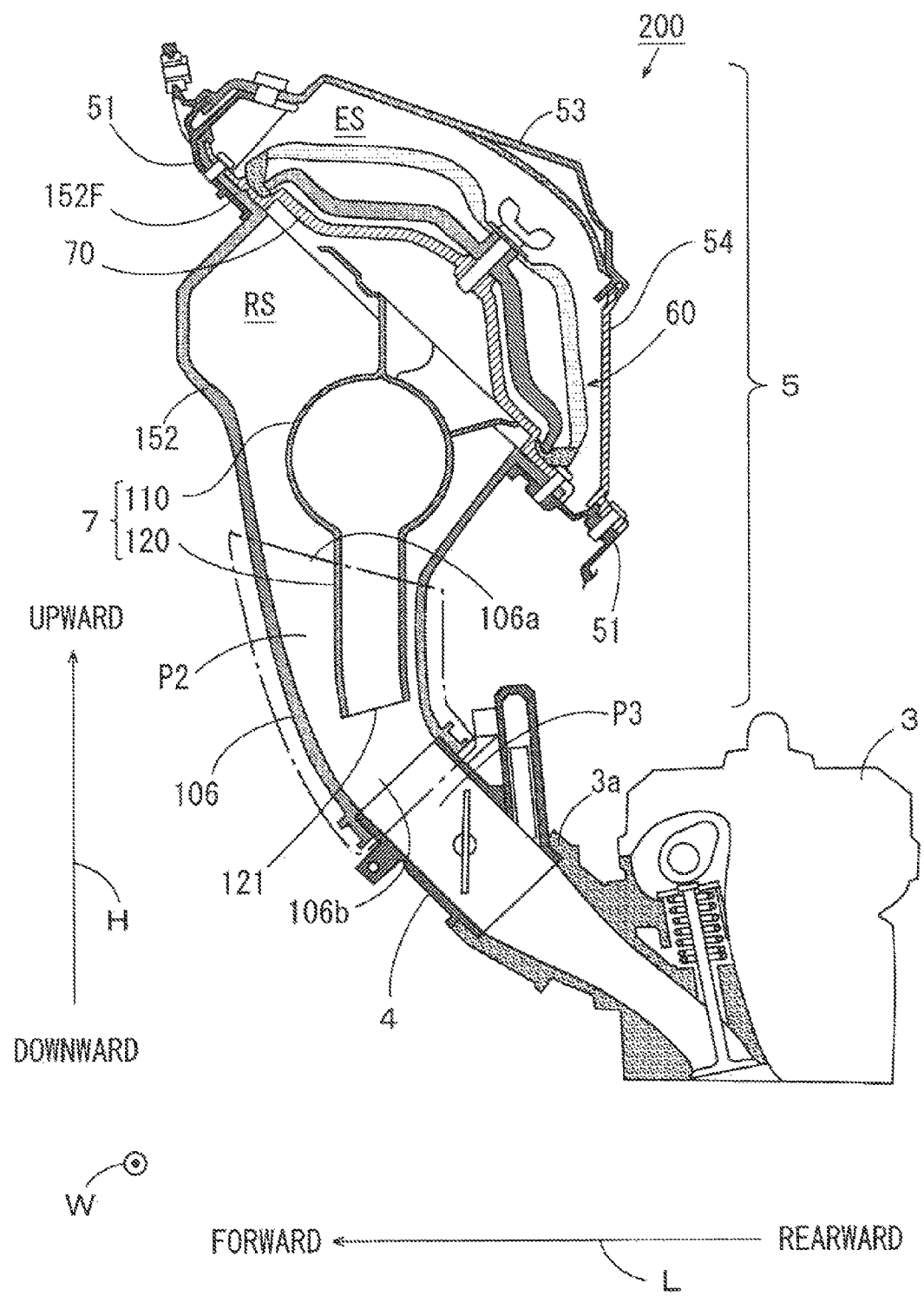
FIG. 21 is a longitudinal cross sectional view showing an intake noise reduction device according to the first modified example.

FIG. 21 is a longitudinal cross sectional view showing the intake noise reduction device 200 according to the first modified example. The intake noise reduction device 200 of FIG. 21 includes the downstream duct 152 and the intake funnel 106 of FIGS. 20A, 20B. In FIG. 21, the intake funnel 106 is surrounded by a one-dot and dash line similarly to the example of FIG. 20B.

Even in the first modified example, the resonator 7 is stored in the inner space RS of the downstream duct 152. The opening end 121 of the pipe portion 120 of the resonator 7 is inserted into the intake funnel 106. Further, a cross sectional area of the intake passage P2 formed between the intake funnel 106 and the pipe portion 120 is set to not less than the opening area of the intake passage P3 of the throttle body 4. Thus, a reduction in intake noise of the engine 3 can be improved without limitation of the layout and design of the surroundings of the intake system.

(5) Second Modified Example

As described above, in the intake noise reduction device 200 according to the embodiments of the present invention, the measurements of each constituent element are set such that the cross sectional area of the intake passage P2 formed between the intake funnel 6 and the pipe portion 120 is not less than the opening area of the intake passage P3 of the throttle body 4.

In the configuration of the intake noise reduction device 200 of FIG. 9, when the maximum throttle opening is set large, the cross sectional area of the intake passage P2 between the intake funnel 6 and the pipe portion 120 may be smaller than the opening area of the intake passage P3 of the throttle body 4. Therefore, a configuration in which an inner diameter of a portion, of the intake funnel 6, into which the pipe portion 120 of the resonator 7 is inserted is increased is considered.

Figure 22:
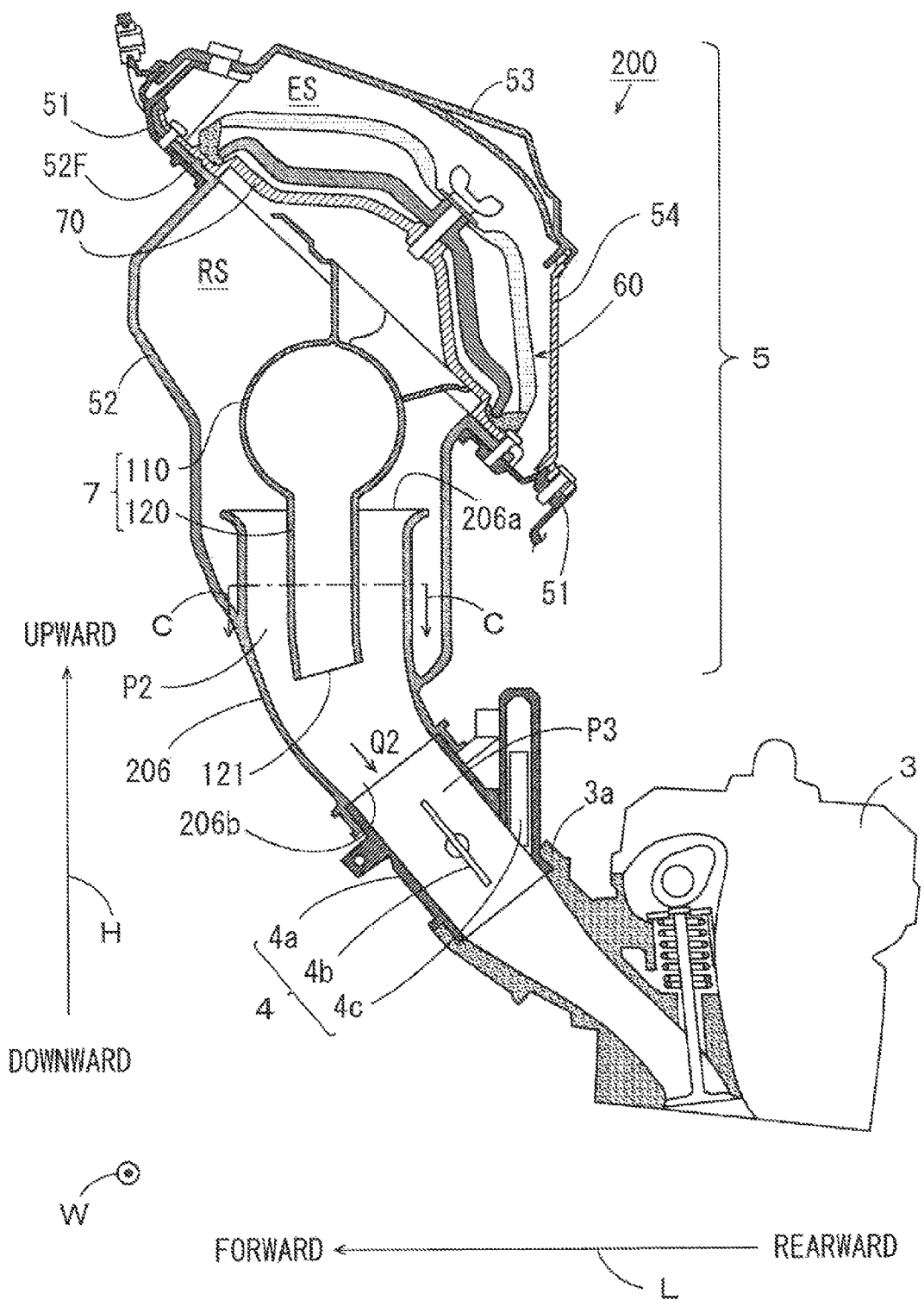
FIG. 22 is a longitudinal cross sectional view showing an intake noise reduction device according to a second modified example.

FIG. 22 is a longitudinal cross sectional view showing an intake noise reduction device 200 according to the second modified example. An intake funnel 206 provided in the intake noise reduction device 200 of FIG. 22 is set such that the inner diameter of the portion into which the pipe portion 120 of the resonator 7 is inserted is sufficiently larger than the intake funnel 6 of FIGS. 5A, 5B.

Figure 23A:
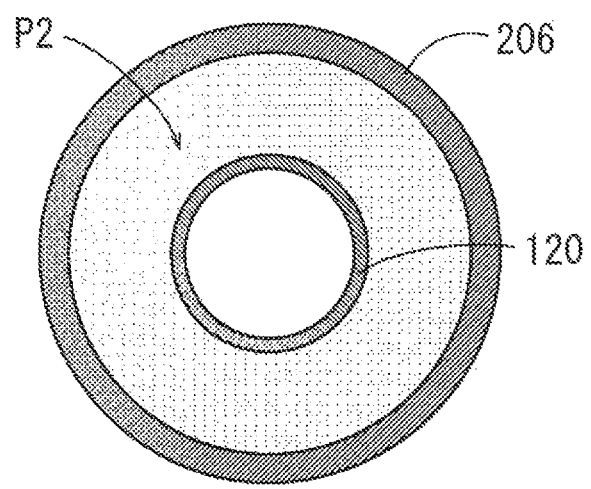
FIG. 23A is a cross sectional view taken along the line C-C of FIG. 22.
Figure 23B:
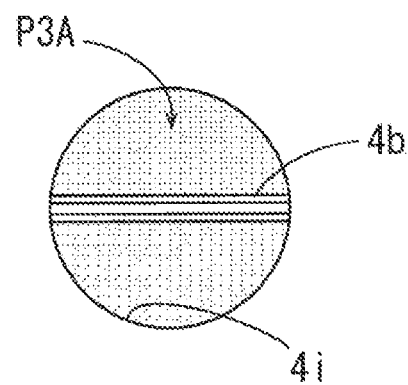
FIG. 23B is a diagram showing an inner space of the throttle body as viewed in a direction of an arrow Q2 of FIG. 22.

FIG. 23A is a cross sectional view taken along the line C-C of FIG. 22, and FIG. 23B is a diagram showing an inner space of the throttle body 4 as viewed in a direction of an arrow Q2 of FIG. 22. In FIG. 23A, a cross section of the intake passage P2 is indicated by the dotted pattern. In FIG. 23B, an inner peripheral surface of the flow path forming pipe 4a of FIG. 22 is indicated by a numeral reference 4i, and an opening P3A formed when the throttle valve 4b is opened is indicated by the dotted pattern.

As shown in FIG. 23A, a cross sectional area of the intake passage P2 between the intake funnel 206 and the pipe portion 120 of the present example is sufficiently larger than the cross sectional area of the intake passage P2 between the intake funnel 6 and the pipe portion 120 of FIG. 19A. In this case, as shown in FIG. 23B, even when the throttle valve 4b is fully opened, the cross sectional area of the intake passage P2 between the intake funnel 206 and the pipe portion 120 is not less than the opening area of the intake passage P3 of the throttle body 4. Thus, even when the maximum throttle opening is equal to the throttle valve 4b being fully opened, a reduction in intake performance of the engine 3 is prevented.

(6) Noise Reduction Performance Test of Intake Noise Reduction Device

The inventor of the present application performed the noise reduction performance test regarding the intake noise reduction device 200 of FIG. 9. Specifically, the inventor of the present application installed a microphone near an intake valve of the engine 3 connected to the intake noise reduction device 200 of FIG. 9, and installed a microphone near the first opening 55a of the air cleaner 5 (FIG. 7). Further, the inventor of the present application calculated a gain of amplitude of test noise in the first opening 55a (FIG. 7) with respect to amplitude of the test noise in the engine 3 based on noise signals acquired by the two microphones with the throttle valve 4b being kept opened to the maximum throttle opening. The test noise includes the noise of a frequency of about 300 Hz equivalent to the above-mentioned intake noise.

Further, the inventor of the present application performed the noise reduction performance test similar to the above-mentioned example regarding the configuration in which the resonator 7 was removed from the intake noise reduction device 200 of FIG. 9. Further, the inventor of the present application performed a noise reduction performance test similar to the above-mentioned example regarding an intake noise reduction device of a comparative example described below.

Figure 24:
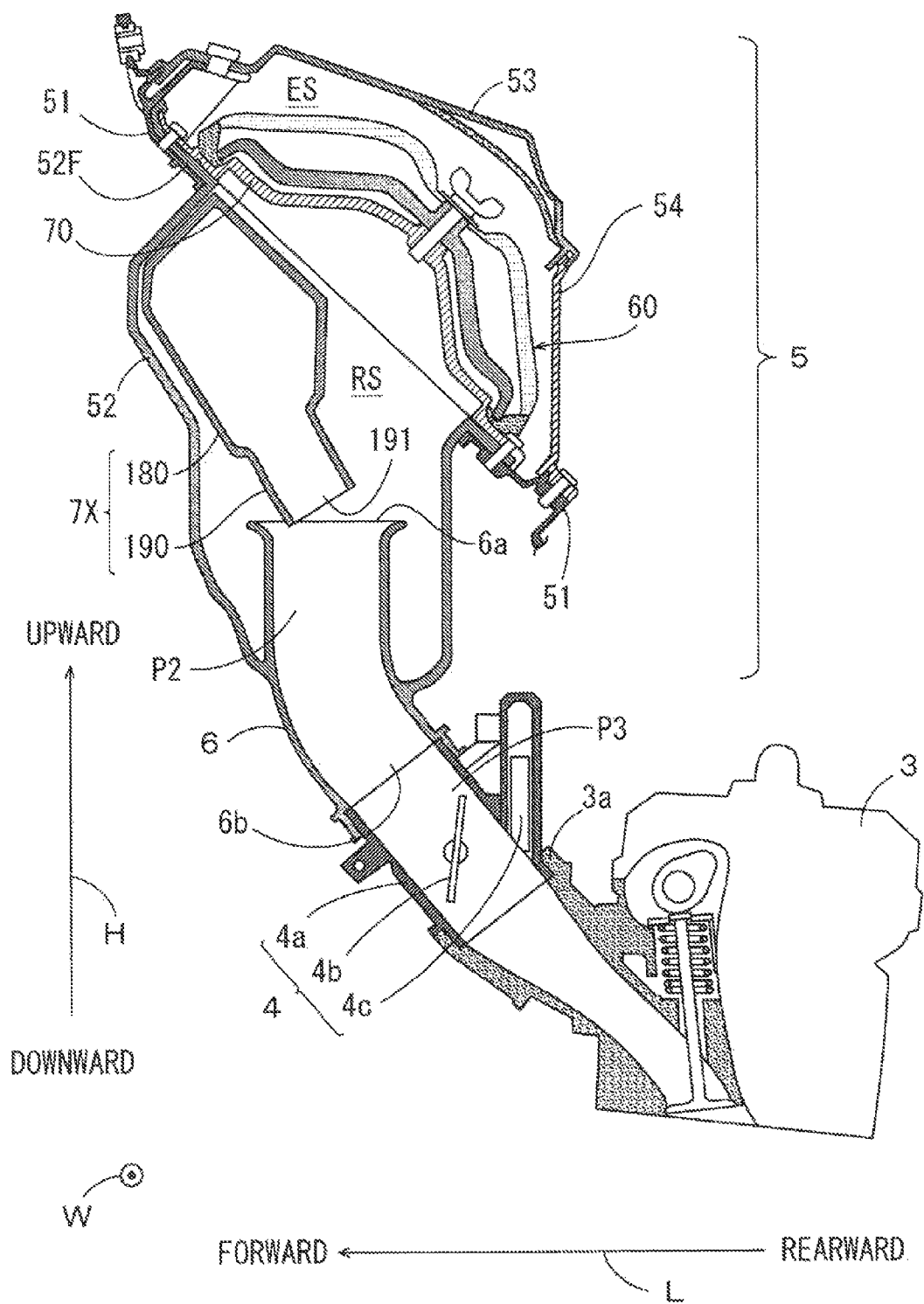
FIG. 24 is a longitudinal cross sectional view showing an intake noise reduction device of a comparative example used in a noise reduction performance test.

FIG. 24 is a longitudinal cross sectional view showing the intake noise reduction device of the comparative example used in the noise reduction performance test. As shown in FIG. 24, the configuration of the intake noise reduction device of the comparative example is equal to the configuration of the intake noise reduction device 200 of FIG. 9 except for a configuration and arrangement of a resonator 7X stored in the inner space RS of the downstream duct 52.

The resonator 7X has a chamber 180 and a pipe portion 190. The chamber 180 has a substantially rectangular parallelepiped shape, and the pipe portion 190 is formed to obliquely extend downward from the lower end of the chamber 180. An opening end 191 is formed at the lower end of the pipe portion 190. The opening end 191 of the pipe portion 190 is not inserted into the intake funnel 6. The measurements of the resonator 7X are set such that a resonant frequency of the resonator 7X is equal to the resonant frequency of the resonator 7 of FIG. 9.

Figure 25:
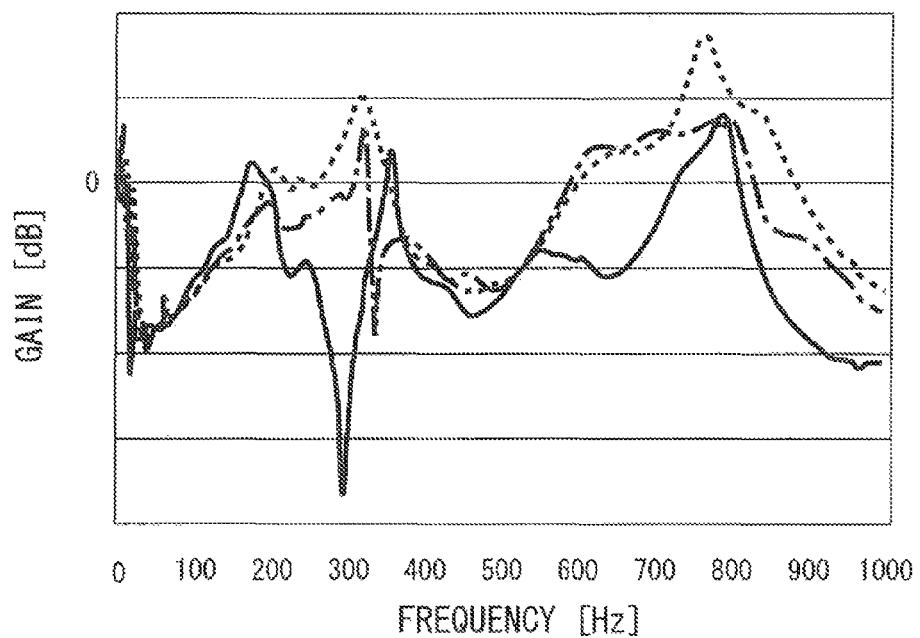
FIG. 25 is a graph showing the results of the noise reduction performance test of the intake noise reduction device.

FIG. 25 is a graph showing the results of the noise reduction performance test of the intake noise reduction device. The ordinate of FIG. 25 indicates the gain of amplitude of the noise, and the abscissa indicates the frequency. Further, a thick solid line in the graph indicates the result of the noise reduction performance test regarding the intake noise reduction device 200 of FIG. 9, a thick dotted line indicates the result of the noise reduction performance test regarding the configuration in which the resonator 7 is removed from the intake noise reduction device 200 of FIG. 9, and a thick one-dot and dash line indicates the result of the noise reduction performance test regarding the intake noise reduction device of FIG. 24.

In the graph of FIG. 25, when the gain of amplitude of the noise indicates a positive value, it indicates that the noise transmitted from the engine 3 to the first opening 55a is amplified. Further, it indicates that the larger a value of the gain of amplitude of the noise is, the larger a degree of amplitude of the noise is. In this case, noise leaking from the intake noise reduction device 200 is increased.

On the one hand, when the gain of amplitude of the noise indicates a negative value, it indicates that the noise transmitted from the engine 3 to the first opening 55a is attenuated. Further, it indicates that the larger a value of the gain of amplitude of the noise is, the larger a degree of attenuation of the noise is. In this case, the noise leaking from the intake noise reduction device 200 is reduced.

According to the results of the noise reduction performance test of FIG. 25, the gain of amplitude of the test noise regarding the intake noise reduction device 200 of FIG. 9 indicates a negative value and markedly reduced at the frequency of the intake noise (about 300 Hz). Thus, it is found that the intake noise transmitted from the engine 3 to the first opening 55a is largely attenuated.

On the one hand, the gains of amplitude of the test noise regarding the configuration in which the resonator 7 is removed from the intake noise reduction device 200 of FIG. 9 and the intake noise reduction device of FIG. 24 indicate positive values and increased at the frequency of the intake noise (about 300 Hz). Thus, it is found that the intake noise transmitted from the engine 3 to the first opening 55a is largely amplified.

As a result, it was confirmed that the intake noise reduction device 200 of FIG. 9 caused the noise having the similar frequency to the intake noise to be sufficiently reduced by the resonator 7 and the intake noise leaking from the air cleaner 5 to be sufficiently reduced.

(7) Noise Test of Motorcycle

The inventor of the present application measured noise during acceleration travelling of the motorcycle 100 of FIG. 1. Specifically, the inventor of the present application measured the level of noise pressure of the noise generated from the motorcycle 100 during a period in which a vehicle speed reached a predetermined second speed (60 km/h, for example) from a predetermined first speed (30 km/h, for example) with the accelerator being opened to the maximum.

Further, the inventor of the present invention removed the resonator 7 from the motorcycle 100 of FIG. 1, and measured the level of noise pressure of the noise generated from the motorcycle 100 from which the resonator 7 was removed by the similar steps to the above-mentioned example.

Figure 26:
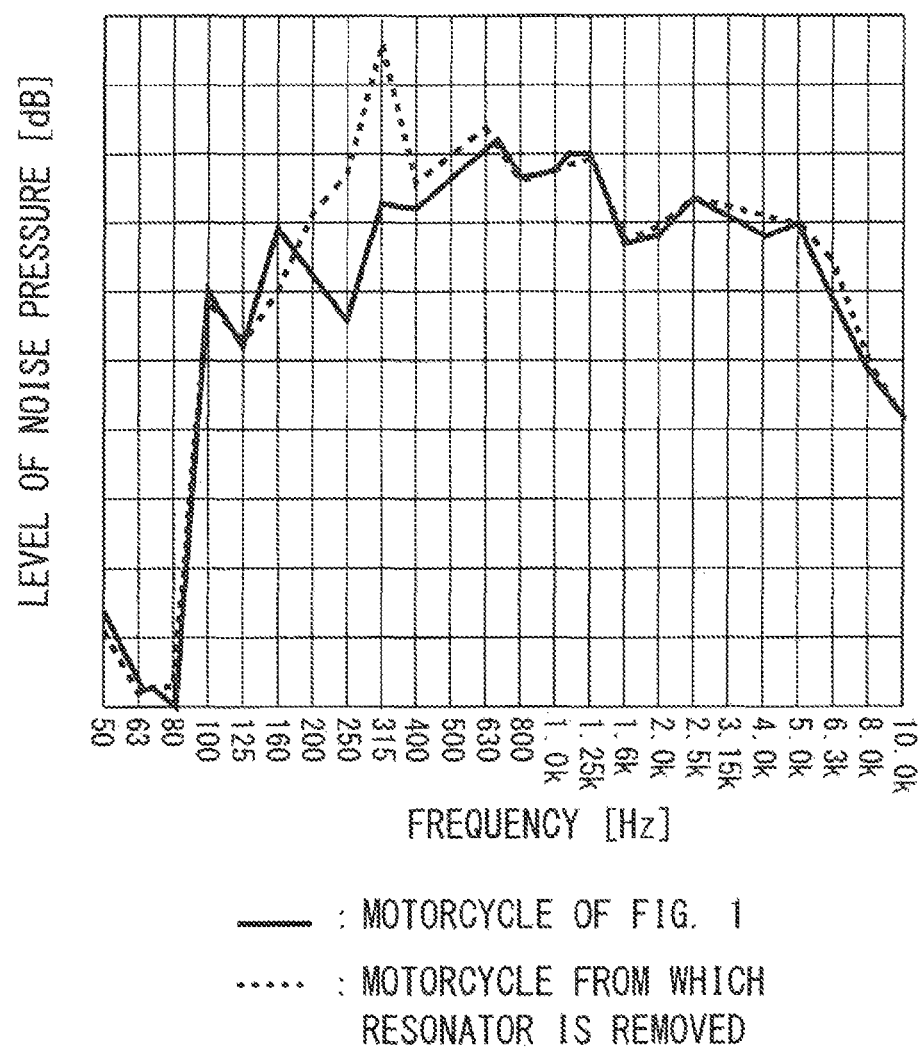
FIG. 26 is a graph showing the measurement results of noise during acceleration travelling of the motorcycle.

FIG. 26 is a graph showing the measurement results of the noise during the acceleration travelling of the motorcycle 100. The ordinate of FIG. 26 indicates the noise pressure, and the abscissa indicates the frequency. Further, a thick solid line in the graph indicates the level of noise pressure of the noise generated from the motorcycle 100 of FIG. 1, and a thick dotted line indicates the level of noise pressure of the noise generated from the motorcycle 100 from which the resonator 7 is removed.

As described above, in the motorcycle 100 from which the resonator 7 is removed, the intake noise is hardly reduced. Therefore, as shown in FIG. 26, the level of noise pressure is markedly increased in a range of 250 Hz to 400 Hz that includes the frequency of the intake noise. On the one hand, in the motorcycle 100 of FIG. 1, the level of noise pressure of the noise is sufficiently reduced in the range of 250 Hz to 400 Hz.

The inventor of the present application further measured the noise generated from the above-mentioned motorcycle 100 during the acceleration travelling (acceleration travelling noise). As a result, the acceleration travelling noise of the motorcycle 100 of FIG. 1 including the resonator 7 was lower than the acceleration travelling noise of the motorcycle 100 from which the resonator 7 was removed. The difference between the acceleration travelling noise of the motorcycle 100 of FIG. 1 including the resonator 7 and the acceleration travelling noise of the motorcycle 100 from which the resonator 7 was removed was about 3 dB.

In this manner, it was confirmed that the noise generated from the motorcycle 100 was sufficiently reduced when the intake noise reduction device 200 including the resonator 7 was provided in the motorcycle 100.

(8) Acceleration Performance of Motorcycle

The inventor of the present application measured a distance by which the motorcycle 100 advanced in the period in which the vehicle speed reached the second speed from the first speed at a time of measurement of the noise during the above-mentioned acceleration travelling of the motorcycle 100 in order to confirm whether the acceleration performance of the motorcycle 100 was reduced by the resonator 7. In this case, the shorter the measured distance is, the higher the acceleration performance of the motorcycle 100 is, and the longer the measured distance is, the lower the acceleration performance of the motorcycle 100 is.

As a result of the measurement of the advanced distance of the motorcycle 100, the measured distance regarding the motorcycle 100 of FIG. 1 was equal to the distance measured regarding the motorcycle 100 from which the resonator 7 was removed. In this manner, in the motorcycle 100 of FIG. 1, a reduction in acceleration performance due to the resonator 7 was not found.

(9) Output Characteristics of Engine

The inventor of the present application performed a test, described below, in order to confirm whether the output characteristics of the engine 3 were reduced by the resonator 7.

The inventor of the present application measured the output of the engine 3 of when the throttle valve 4b was opened to the maximum throttle opening in the configuration in which the throttle body 4 and the engine 3 were connected to the intake noise reduction device 200 of FIG. 9 by a dynamometer. Further, the inventor of the present application removed the resonator 7 from the intake noise reduction device 200 of FIG. 9 and measured again the output of the engine 3 of when the throttle valve 4b was opened to the maximum throttle opening by the dynamometer.

The result of measurement of the output of the engine 3 of when the intake noise reduction device 200 including the resonator 7 was used was substantially equal to the result of measurement of the output of the engine 3 of when the intake noise reduction device 200 from which the resonator 7 was removed was used. In this manner, the output of the engine 3 was constant regardless of presence or absence of the resonator 7. That is, it was confirmed that the output performance of the engine 3 was not reduced due to the resonator 7. As a result, it is found that the intake performance of the engine 3 is not reduced due to the resonator 7.

(10) Other Embodiments (10-1) In the above-mentioned embodiments, each resonator 7 used in the intake noise reduction device 200 of FIGS. 9, 21, 22 includes the spherical chamber 110A and the pipe portion 120 having a circular cross section. The chamber 110A of the resonator 7 may have a rectangular parallelepiped shape instead of a spherical shape. Further, the cross section of the pipe portion 120 may be oval or rectangular instead of circular.

(10-2) In the above-mentioned embodiments, the resonator 7 is attached to the lower portion of the element support member 70. The resonator 7 may be attached to the duct main body 52M of the downstream duct 52, or the duct main body 152M of the downstream duct 152. It is not limited that the resonator 7 is attached to the element support member 70. Further, the resonator 7 does not have to have the plate-shape member 130.

(10-3) While the above-mentioned embodiments are examples in which the present invention is applied to the motorcycle, the invention is not limited to this. The present invention may be applied to another straddle-type vehicle such as a motor tricycle, all-terrain vehicle (ATV), or the like.

(11) Correspondences Between Constituent Elements in Claims and Parts in Preferred Embodiments In the following paragraphs, non-limiting examples of correspondences between various elements recited in the claims below and those described above with respect to various preferred embodiments of the present invention are explained.

In the above-mentioned embodiment, the engine 3 is an example of an engine, the intake noise reduction device 200 is an example of an intake noise reduction device, the air cleaner 5 is an example of an air cleaner, the intake funnels 6, 106 are examples of an intake funnel, the upstream openings 6a of the intake funnel 6 and the upstream opening 106a of the intake funnels 106 are examples of an upstream opening, and the downstream opening 6b of the intake funnel 6 and the downstream opening 106b of the intake funnels 106 are examples of a downstream opening.

Further, the throttle body 4 is an example of a throttle body, the chamber portion 110 is an example of a chamber portion, the pipe portion 120 is an example of a pipe portion, the resonator 7 is an example of a resonator, and an opening end 121 of the pipe portion 120 is an example of an opening end.

Further, the filter element 60 is an example of a filter element, the base 51, the upper cover 53 and the rear cover 54 are examples of a casing, the element support member 70 is an example of a support member, the plate-shape member 130 and the supporter 140 are examples of an attachment portion, and the plate-shape member 130 is an example of a plate-shape member.

Further, the projection 111 is an example of a projection, the rear wheel 23 is an example of a drive wheel, the motorcycle 100 is an example of a straddle-type vehicle, the head pipe 1 is an example of a head pipe, the main frame 11 is an example of a main frame, and the down frame 12 is an example of a down frame.

As each of constituent elements recited in the claims, various other elements having configurations or functions described in the claims can be also used.

While preferred embodiments of the present invention have been described above, it is to be understood that variations and modifications will be apparent to those skilled in the art without departing the scope and spirit of the present invention. The scope of the present invention, therefore, is to be determined solely by the following claims.

INDUSTRIAL APPLICABILITY

The present invention can be effectively utilized for mechanic structures having engines.

We claim:

1. An intake noise reduction device that leads air to an engine, comprising:
    an air cleaner;
    an intake funnel having an upstream opening positioned in the air cleaner;
    a throttle body provided between a downstream opening of the intake funnel and an intake port of the engine; and
    a resonator having a chamber portion and a pipe portion, the resonator being arranged in the air cleaner such that an opening end of the pipe portion is inserted into the intake funnel, and
    a cross-sectional area of a passage formed between an inner peripheral surface of the intake funnel and an outer peripheral surface of the pipe portion is set to be not less than an opening area of an intake passage of the throttle body opened to a maximum throttle opening.

2. The intake noise reduction device according to claim 1, wherein the air cleaner includes
    a filter element, and
    a casing that stores the filter element,
    wherein the intake noise reduction device further comprises a support member that supports the filter element on the casing at a position further upstream than the intake funnel, and
    further wherein the chamber portion of the resonator is provided at a position further downstream than the filter element.

3. The intake noise reduction device according to claim 2, wherein the chamber portion of the resonator has an attachment portion attached to the support member.

4. The intake noise reduction device according to claim 3, wherein the attachment portion includes a plate-shape member provided to close part of a space located at a position further downstream than the filter element.

5. The intake noise reduction device according to claim 1, wherein the resonator has a projection projecting outward of the upstream opening of the intake funnel.

6. The intake noise reduction device according to claim 5, wherein a lower edge of the projection is formed to extend outward from the pipe portion.

7. A straddle-type vehicle including:
    an engine;
    a drive wheel rotated by motive power generated by the engine; and
    an intake noise reduction device that leads air to the engine, including
        an air cleaner,
        an intake funnel having an upstream opening positioned in the air cleaner,
        a throttle body provided between a downstream opening of the intake funnel and an intake port of the engine, and including an intake passage,
        a resonator having a chamber portion and a pipe portion, the resonator being arranged in the air cleaner such that an opening end of the pipe portion is inserted into the intake funnel,
        a connecting passage formed between an inner peripheral surface of the intake funnel and an outer peripheral surface of the pipe portion, the connecting passage having a cross-sectional area not less than an opening area of the intake passage of the throttle body opened to a maximum throttle opening.

8. The straddle-type vehicle according to claim 7, further comprising:
    a head pipe;
    a main frame that extends in a rearward direction of the vehicle from the head pipe; and
    a down frame that obliquely extends rearward and downward from the head pipe at a position below the main frame, wherein
    the air cleaner is supported at a front portion of the main frame,
    the engine is held by the main frame at a position below the air cleaner, and
    the intake funnel and the throttle body are arranged along the down frame behind the down frame.

* * * * *